United States Patent
Ramesh et al.

(10) Patent No.: US 11,769,218 B1
(45) Date of Patent: Sep. 26, 2023

(54) BEHIND THE METER FLOW CONTROL TO SEPARATE RENEWABLE ENERGY

(71) Applicant: 8ME NOVA, LLC, El Dorado Hills, CA (US)

(72) Inventors: Gautham Ramesh, Emeryville, CA (US); Zeljko Gigio Sakota, Walnut, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/087,386

(22) Filed: Dec. 22, 2022

(51) Int. Cl.
*G06Q 50/06* (2012.01)
*H02J 3/32* (2006.01)
*H02J 7/00* (2006.01)
*H02J 3/38* (2006.01)

(52) U.S. Cl.
CPC ............... *G06Q 50/06* (2013.01); *H02J 3/32* (2013.01); *H02J 3/381* (2013.01); *H02J 7/0048* (2020.01); *H02J 2300/24* (2020.01); *H02J 2300/40* (2020.01)

(58) Field of Classification Search
None
See application file for complete search history.

(56) References Cited

U.S. PATENT DOCUMENTS

| | | | | |
|---|---|---|---|---|
| 9,627,890 B2* | 4/2017 | Buchstaller | ............ | H02J 3/381 |
| 10,355,611 B2* | 7/2019 | Nagashima | ............ | B60L 55/00 |
| 10,784,812 B2* | 9/2020 | Berkowitz | ............ | H02J 3/466 |
| 11,031,781 B1* | 6/2021 | Zanone | ............ | G05B 19/042 |
| 11,043,809 B1* | 6/2021 | Akyol | ............ | H02J 7/35 |
| 11,063,554 B1* | 7/2021 | Hansen | ............ | H02S 50/00 |
| 11,063,556 B1* | 7/2021 | Piatt | ............ | H02S 50/00 |
| 11,081,887 B1* | 8/2021 | Buttgenbach | ............ | H02S 40/38 |
| 11,171,485 B1* | 11/2021 | Ramesh | ............ | H02J 3/32 |
| 11,404,871 B1* | 8/2022 | Hansen | ............ | H02J 3/28 |
| 11,431,169 B1* | 8/2022 | Buttgenbach | ............ | H02J 3/32 |
| 11,451,060 B1* | 9/2022 | Buttgenbach | ............ | H02J 3/38 |
| 11,482,864 B1* | 10/2022 | Kanan | ............ | H02J 3/0075 |
| 2014/0070756 A1* | 3/2014 | Kearns | ............ | H02J 7/02 320/101 |
| 2015/0148973 A1* | 5/2015 | Ye | ............ | H02J 1/10 700/286 |
| 2015/0256103 A1* | 9/2015 | Chiang | ............ | H02J 3/381 307/24 |
| 2016/0176305 A1* | 6/2016 | James | ............ | H02J 3/38 307/26 |
| 2016/0336623 A1* | 11/2016 | Nayar | ............ | H02J 7/0068 |

(Continued)

OTHER PUBLICATIONS

Zhao et al., "Review of energy storage system for wind power integration support", Jan. 2014, Applied Energy 137 (2015) 545-553. (Year: 2014).*

(Continued)

*Primary Examiner* — Mohammad Ali
*Assistant Examiner* — Kelvin Booker
(74) *Attorney, Agent, or Firm* — Foley & Lardner LLP

(57) ABSTRACT

A system includes a first renewable energy source (RES) configured to provide electrical energy; a first circuit comprising a first energy storage system (ESS) and a point of interconnection (POI) coupled to a power grid; a second circuit comprising a second ESS and a source-sensitive destination; and a first switch configured to selectively connect one of the first circuit or the second circuit to the first RES.

19 Claims, 13 Drawing Sheets

(56) References Cited

U.S. PATENT DOCUMENTS

| | | | | |
|---|---|---|---|---|
| 2016/0372763 | A1* | 12/2016 | Lu | H02J 7/0045 |
| 2016/0372925 | A1* | 12/2016 | Chow | H02J 3/32 |
| 2017/0085091 | A1* | 3/2017 | Kamalasadan | H02J 3/003 |
| 2017/0168516 | A1* | 6/2017 | King | H02J 3/32 |
| 2017/0237259 | A1* | 8/2017 | Yoon | H02J 7/007 |
| | | | | 307/20 |
| 2020/0259358 | A1* | 8/2020 | Hansen | H01M 10/425 |
| 2022/0052523 | A1* | 2/2022 | Zanone | H02J 3/008 |
| 2022/0052524 | A1* | 2/2022 | Akyol | H02S 40/38 |
| 2022/0052525 | A1* | 2/2022 | Buttgenbach | H02J 3/007 |
| 2022/0376509 | A1* | 11/2022 | Ramesh | H02J 3/32 |
| 2022/0376510 | A1* | 11/2022 | Ramesh | H02S 10/12 |
| 2023/0178985 | A1* | 6/2023 | Zanone | H02S 50/00 |
| | | | | 702/61 |

OTHER PUBLICATIONS

Teleke et al., "Rule-Based Control of Battery Energy Storage for Dispatching Intermittent Renewable Sources", Sep. 2009, IEEE Transactions on Sustainable Energy, vol. 1, No. 3, Oct. 2010. (Year: 2009).*

Tan et al., "Empowering smart grid: A comprehensive review of energy storage technology and application with renewable energy integration", Feb. 2021, Journal of Energy Storage 39 (2021). (Year: 2021).*

Javed et al., Hybrid pumped hydro and battery storage for renewable energy based power supply system, May 2019, Applied Energy 257 (2020). (Year: 2019).*

Das et al., "Power Flow Control of PV-Wind-Battery Hybrid Renewable Energy Systems for Stand-Alone Application", Jul. 2017, International Journal of Renewable Energy Research, vol. 8, No. 1, Mar. 2018. (Year: 2017).*

Dang et al., "SoC Feedback Control for Wind and ESS Hybrid Power System Frequency Regulation", Sep. 2013, IEEE Journal of Emerging and Selected Topics in Power Electronics, vol. 2, No. 1, Mar. 2014. (Year: 2013).*

Babu et al., "A Comprehensive Review of Hybrid Energy Storage Systems: Converter Topologies, Control Strategies and Future Prospects", Jul. 2020, Digital Object Identifier 10.1109/ACCESS.2020.3015919. (Year: 2020).*

* cited by examiner

BEHIND THE METER FLOW CONTROL TO SEPARATE RENEWABLE ENERGY

BACKGROUND

Renewable energy power plants (REPPs) may include one or more renewable energy sources (RES), such as photovoltaic (PV) panels and wind turbines. A REPP may be configured to supply electricity to a nearby behind-the-meter (BTM) load, such as a home or commercial building without connecting first to an electrical grid. The REPP may also be connected to a commercial electricity grid so that excess energy produced by the RES can be sold to the grid. The RES and the BTM load can also be electrically coupled to an energy storage system (ESS) such as a battery bank. The ESS may store excess electricity generated by the RES when electricity demand is relatively low and supply is relatively high, such as during the day, and may deliver the energy to the grid or the BTM load when electricity demand is high and supply is relatively low and/or when the RES is not producing electricity, such as in the evening or at night. The grid connection may also be used to enable delivery of energy to the BTM load from the grid, for example when the RES and the ESS together are unable to meet the energy demanded by the BTM load. In some cases, however, the owner or operator of the BTM load may desire or require that no grid power, which may be generated by non-renewable sources, reaches the load. Similarly, the owner or operator of a load connected to the REPP via the grid may desire or require that at least as much renewable energy is being delivered to the grid as is demanded by the load.

DETAILED DESCRIPTION

Figure 1A:
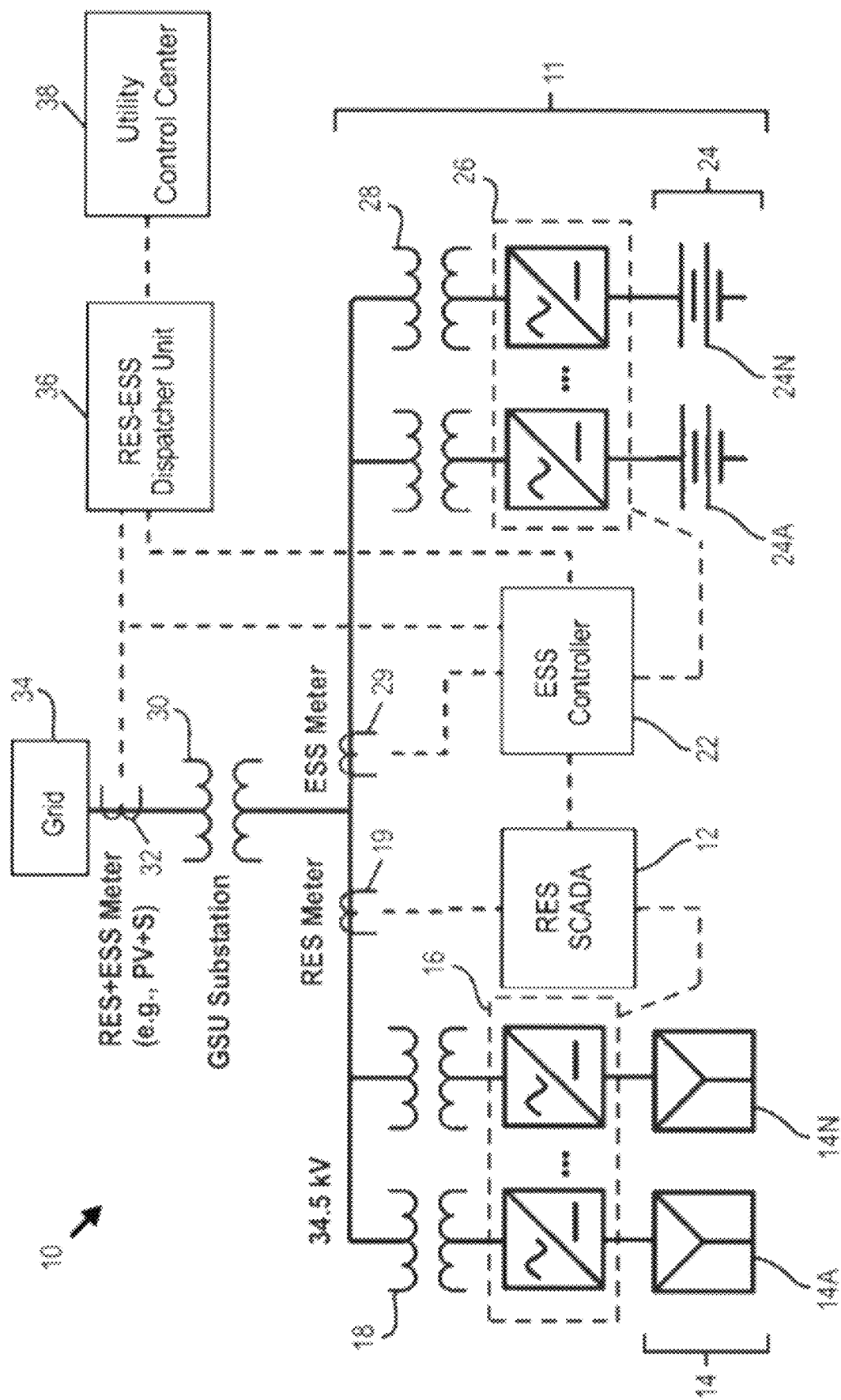
FIG. 1A is a schematic diagram of a metering and control system for controlling a renewable energy source and energy storage system, according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Owners and operators of homes, commercial buildings, and other electrical load sources, including apartment buildings, office buildings, factories, mines, and the like may be committed to operating using solely renewable energy, or a minimum percentage of renewable energy. An ESS that is connected to the grid as well as a RES (e.g., a PV panel array) may store electricity generated by the grid and deliver the grid electricity to a BTM load when the RES and ESS do not provide enough capacity. Because grid power is often produced by mixed energy generation sources that may include renewable energy sources, such as hydroelectric, wind, and solar, and nonrenewable energy sources, such as coal and natural gas, the loads are likely to receive at least some power from nonrenewable energy sources. For certain owners and operators of homes and businesses, this may be either undesirable or unacceptable. One solution to address such preferences is to separate the REPP, including the RES and the ESS, from the grid entirely, however, excess electricity generated by the PV panel array must be stored, used, or clipped (e.g., wasted), or the panels can be covered or rotated away from the sun to reduce output, resulting in wasted capacity that could otherwise be delivered to the grid. Accordingly, a solution is required that allows electricity to flow from the RES to the grid, but does not allow electricity to flow from the grid to the BTM load, even indirectly by charging the ESS from the grid and supplying the stored energy to the BTM load. Further, owners and operators of grid-connected loads may request or require that all or a percentage of the power delivered to their loads is generated from renewable energy sources. Accordingly, a solution is needed to track and control how much power is being delivered to the grid from renewable and non-renewable power sources.

The systems and methods discussed herein may allow a RES to be coupled to a BTM load as well as the grid, without allowing power from the grid to reach the BTM load. The system may guarantee that only renewable power is supplied to the BTM load by controlling the direction of the flow of power in the system or by controlling switches to selectively decouple various energy sources and loads. The systems and methods discussed herein may also allow the amount of renewable power and non-renewable power delivered to a BTM load or the grid to be tracked and for source-sensitive power destinations (e.g., generation source-sensitive destinations) to be alerted when the system cannot guarantee that all of their power has been generated by renewable energy sources. As used herein "source-sensitive destination" refers to an energy destination (e.g., an electrical load, etc.) with a preference or requirement (e.g., with an operator having a preference or a requirement) for energy generated by renewable energy sources. "Non-source-sensitive destination" refers to an energy destination without such a preference or requirement.

The systems and methods discussed herein may also allow for the tracking of amounts of renewable power and non-renewable power delivered to an ESS and amounts of power delivered to source-sensitive destinations and nonsource-sensitive destinations. For example, the systems may include flow meters positioned between a RES and the ESS and between the ESS and an electrical grid coupled to the source-sensitive destinations and non-source-sensitive destinations. The systems may also include state of charge monitoring systems to measure a state of charge of the ESS and to determine the amount of renewable and non-renewable energy in the ESS based on the source providing power to the ESS. The amount of renewable energy stored in the ESS or flowing from the ESS to the grid can be compared to the amount of energy delivered to the source-sensitive destinations to ensure that at least as much renewable power is being supplied to the grid as power is being supplied to the source-sensitive destinations. In some cases, the operator of the source-sensitive destination may require that no non-renewable power at all is being supplied to the source-sensitive destination. The system may fully drain the ESS of charge before power is supplied from the ESS to the source-sensitive destination to ensure that no non-renewable energy stored in the ESS can be delivered to the source-sensitive destination. In some cases, the system may transmit a message to the source-sensitive destination upon determining the renewable energy of the ESS cannot satisfy the energy requirements of the source-sensitive destination.

The systems and methods discussed herein may also allow for a first ESS to receive only renewable energy and a second ESS to receive non-renewable or mixed power and for the flow of energy in and out of each ESS to be tracked as the ESSs deliver power to an electrical grid or other electrical loads. For example, the system may establish a unidirectional flow of power from a renewable energy-only ESS to a mixed energy ESS and an electrical grid so that no non-renewable energy from the mixed energy ESS or the grid can reach the renewable energy-only ESS. In another example, the renewable energy-only ESS and a mixed energy ESS are both connected to a RES and an electrical grid. A unidirectional flow of power from the renewable energy-only ESS to the electrical grid may be established such that the renewable energy-only ESS cannot receive energy from the grid, while a bidirectional flow of energy may be established between the mixed energy ESS and the electrical grid. The flow of power from each ESS to the grid can be monitored to determine how much of the power to the grid is from the renewable energy-only ESS and thus guaranteed to be generated from renewable sources. In some embodiments, the systems may include switches that selectively couple a renewable energy source to a first circuit including a renewable energy-only ESS or to a second circuit including a mixed energy ESS. The switches may switch between connecting the first circuit to the grid and the second circuit to the grid. The switch may be coupled such that the first and second circuits cannot be connected. The renewable energy-only ESS can be connected to a source-sensitive destination. In some embodiments, no power can flow from the mixed energy ESS or the electrical grid to the source-sensitive destination.

Referring now to FIG. 1A, a schematic diagram showing interconnections between various components of an AC coupled metering and control system 10 for controlling a renewable electrical energy generation device 14 (e.g., a REPP) including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 is shown, according to one embodiment. The renewable energy source electrical storage system (RES-ESS) facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert direct current (DC) power produced by a renewable electrical energy generation device 14 (e.g., a PV array in certain embodiments) or power released by the energy storage device 24 to alternating current (AC) power for coupling to an AC electrical grid 34. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one hydrolysis unit (e.g., configured to electrolyze water to release hydrogen) and a hydrogen storage unit (e.g., adsorbent media for releasably binding hydrogen, storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 can to control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using Distributed Network Protocol 3 (DNP3) and set different configuration options. Additionally, the RES-ESS dispatcher unit 36 may receive or generate an accurate renewable generation forecast (e.g., solar generation forecast). The RES-ESS dispatcher unit 36 may use the forecast to implement the CCD and other control modes.

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
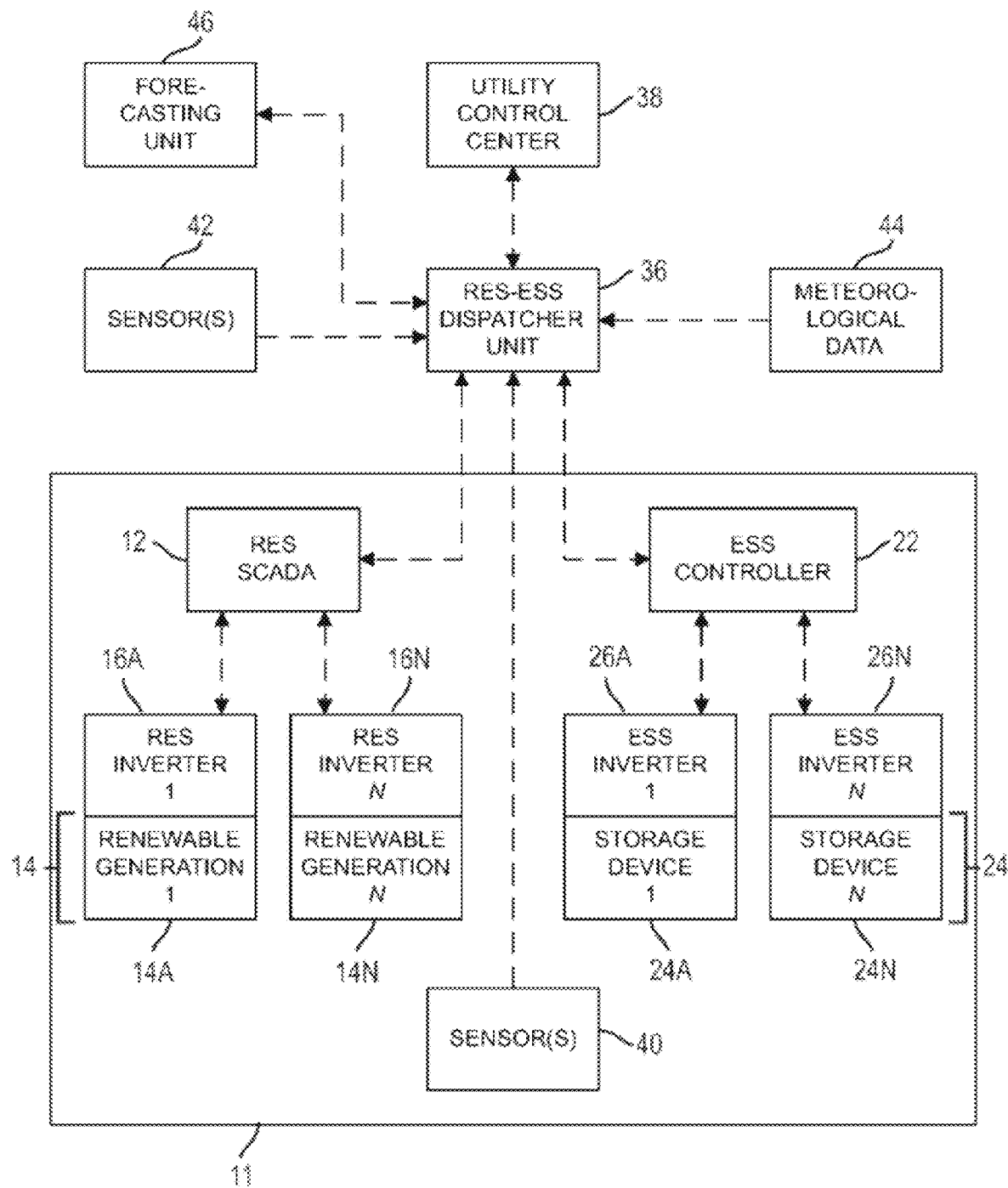
FIG. 1B is a schematic diagram showing certain components of the renewable energy source and energy storage system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 further includes at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
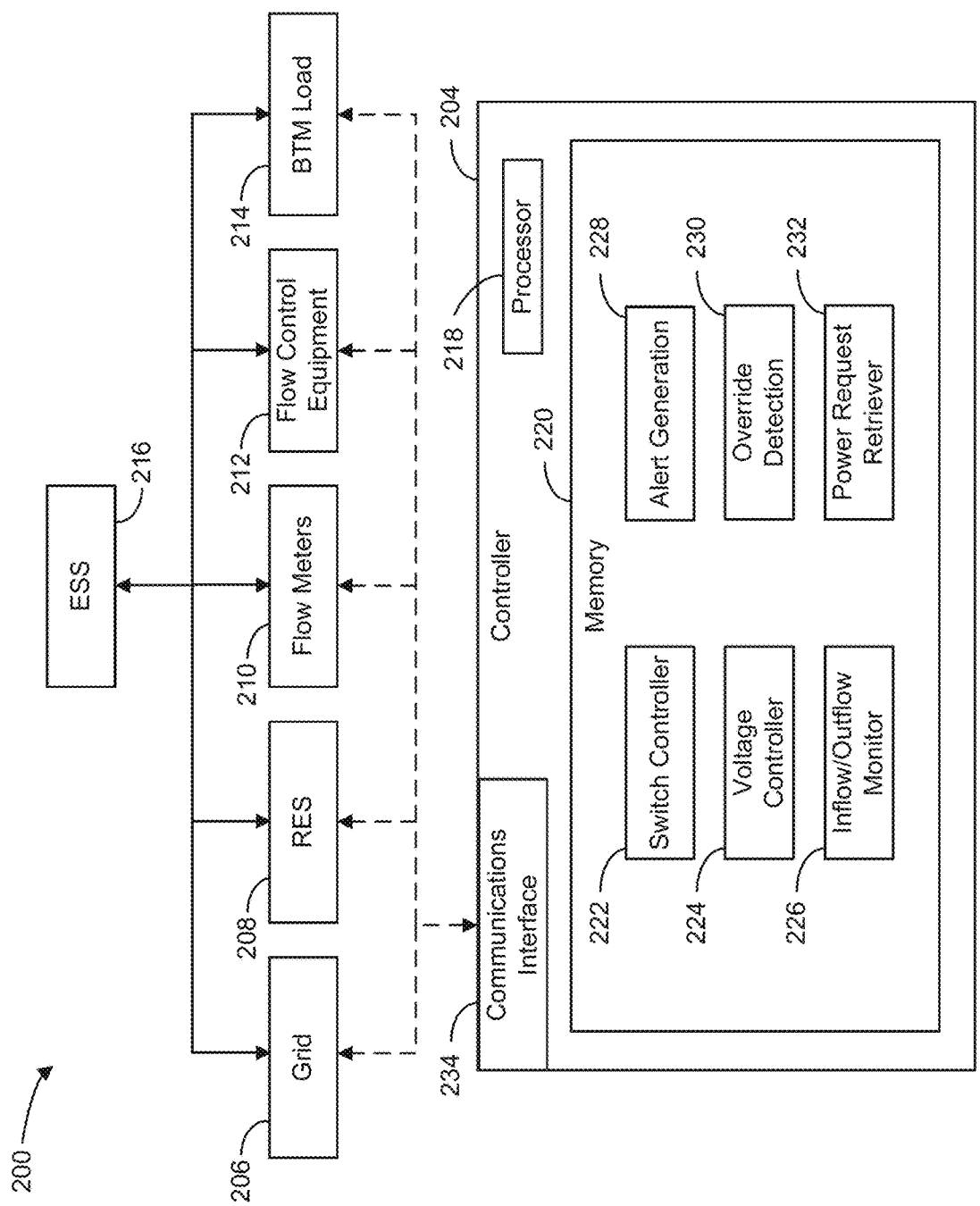
FIG. 2 illustrates a block diagram of an example system for controlling the flow of power in a renewable energy source and energy storage system, according to some embodiments.

Referring now to FIG. 2, a system 200 for controlling the flow of power in a RES-ESS system is shown, in accordance with some embodiments of the present disclosure. In brief overview, the system 200 can include a controller 204 that communicates with an energy grid 206 (e.g., a utility grid operator controlling the energy grid 206), an RES 208 (e.g., one or more solar panels or other types of renewable energy sources), flow meters 210, flow control equipment 212, and/or a BTM load 214 over a network. These components may operate together to control the flow of power between the grid 206, the RES 208, the BTM load 214, and the ESS 216. For example, the ESS 216 may charge via the grid 206 or the RES 208, or discharge to the grid 206 or the BTM load 214 based on how the controller 204 controls the flow control equipment 212. The system 200 may include more, fewer, or different components than shown in FIG. 2. For example, there may be any number of client devices or computers that make up or are a part of the controller 204 or networks in the system 200. There may be additional equipment. For example, the system 200 may include more than one RES 208, more than one grid 206, more than one ESS 216, and/or more than one BTM load 214.

The controller 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The controller 204 can include or utilize at least one processing unit or other logic device such as a programmable logic array engine or a module configured to communicate with one another or other resources or databases. The components of the controller 204 can be separate components or a single component. The system 200 and its components can include hardware elements, such as one or more processors, logic devices, or circuits.

The controller 204 may comprise one or more processors 218 that are configured to control the flow of power in a RES-ESS system. The controller 204 may comprise a communications interface 234, a processor 218, and/or memory 220. The controller 204 may communicate with the RES 208 (or devices controlling the RES 208), the grid 206 (or devices controlling the grid 206), the flow meters 210 (or devices controlling the flow meters 210), the flow control equipment 212 (or devices controlling flow control equipment 212) and/or the BTM load 214 (or devices controlling the BTM load 214) via the communications interface 234. The processor 218 may be or include an ASIC, one or more FPGAs, a DSP, circuits containing one or more processing components, circuitry for supporting a microprocessor, a group of processing components, or other suitable electronic processing components. In some embodiments, the processor 218 may execute computer code or modules (e.g., executable code, object code, source code, script code, machine code, etc.) stored in the memory 220 to facilitate the activities described herein. The memory 220 may be any volatile or non-volatile computer-readable storage medium capable of storing data or computer code.

The memory 220 may include a switch controller module 222, a voltage controller module 224, an inflow/outflow monitor module 226, an alert generation module 228, an override detection module 230, and/or a power request retriever module 232. In brief overview, the components 222-232 may cooperate to control the flow of power between the grid 206, the RES, 208, the BTM load 214, and the ESS 216. The components 222-232 may receive instructions to deliver power to the grid 206 and/or the BTM load 214, which may include a request that a minimum amount of delivered power is generated from renewable sources. The components 222-232 may determine how much of the power being delivered is generated from renewable sources and may operate the flow control equipment 212 to adjust the amount of power delivered from renewable and non-renewable sources.

The power request retriever module 232 may comprise programmable instructions that, upon execution, cause processor 218 to retrieve power requests from the grid 206 and/or the BTM load 214 via the communications interface 234. The power requests may include a requirement that at least a portion of the power is generated from renewable sources, such as the RES 208. For example, the power request retriever module 232 may retrieve a first request for a first amount of power from the grid 206 that does not include a renewable energy requirement and a second request for power from the BTM load 214 that does include a renewable energy requirement. The power request retriever module 232 may determine trends in power requests and the remaining components and may optimize the charging of the ESSs 216 based on expected energy demands from the grid 206 and/or the BTM load 214.

The switch controller module 222 may comprise programmable instructions that, upon execution, cause the processor 218 to send signals, via the communications interface 234 to various switches of the flow control equipment 212 to make or break connections in the RES-ESS system. For example, the power request retriever module 232 may receive a request for a first amount of power from the grid 206 that does not include a renewable energy requirement and a request for a second amount of power from the BTM load 214 with a 100% renewable energy requirement. The switch controller module 222 may then cause the processor 218 to send signals to the switches via the communications interface 234. The signals may, for example, cause a first switch coupling the BTM load 214 to an ESS 216 containing energy from a non-renewable source to disconnect, and may cause a second switch to couple the BTM load 214 to another ESS containing energy generated only by the RES 208. The signals may then cause a switch to couple the ESS 216 containing energy from a non-renewable source to the grid 206. The switch controller module 222 may cause the processor 218 to send signals to switches to connect various ESSs 216 to the grid 206 and/or the RES 208 based on expected demand determined by the power request retriever module 232. For example, the power request retriever module 232 may determine, based on historical data, that the BTM load 214 is likely to request power generated from only renewable sources on Tuesday. On Monday, the switch controller module 222 may cause one or more switches to operate to fully discharge a first ESS 216 to the grid 206 and then may cause one or more switches to operate to couple the first ESS 216 to the RES 208 so that the first ESS 216 may be fully charged with only renewable energy when the request is received from the BTM load 214 on Tuesday.

The voltage controller module 224 may comprise programmable instructions that, upon execution, cause processor 218 to send signals, via the communications interface 234, to various pieces of flow control equipment 212 to increase or decrease the voltage at different locations in the RES-ESS system. The signals may be sent to inverters, DC-DC converters, transformers, and other equipment configured to adjust voltage in a circuit. For example, in the RES-ESS system, the RES 208 and one or more ESSs 216 may each be coupled to a circuit via inverters, and the grid 206 may be coupled to the circuit via a transformer. The voltage controller module 224 may cause the voltage at the RES inverter to be higher than the voltage in the ESS inverters, causing energy to flow from RES 208 to the ESSs 216. It should be understood that "higher voltage" as used herein refers to the magnitude of the voltage or the "absolute voltage", which may be positive or negative. When energy is requested from the grid 206, the voltage controller module 224 may cause the voltage at the grid transformer to be lower than the voltage at the ESSs 216 such that energy flows from the ESSs 216 to the grid 206. In some embodiments, the voltage controller module 224 may control the voltages at the flow control equipment 212 to establish a unidirectional flow of energy that is not ever changed. For example, the voltage controller module 224 may control the voltage of a first ESS inverter such that it is always lower than the voltage at a first point between the first ESS 216 and the BTM load 214. This may ensure that no energy can ever flow through the first point from the first ESS 216 to the BTM load 214. If the operators of the BTM load 214 require that only renewable energy is delivered to the BTM load 214, and the first ESS 216 may contain non-renewable energy, establishing a unidirectional flow of energy from the first point to the BTM load 214 may ensure that no non-renewable energy can reach the BTM load 214 from the first ESS 216.

The inflow/outflow monitor module 226 may comprise programmable instructions that, upon execution, cause processor 218 to receive inflow and outflow data from the flow meters 210. The flow meters 210 may measure the flow of energy through the system and may also include state of charge (SOC) meters configured to measure the SOC of the ESSs 216. In some embodiments, the grid 206 and/or the BTM load 214 may request energy generated from renewable sources. Data from the flow meters 210 may enable the inflow/outflow monitor module 226 to determine how much energy is flowing into and out of the various components of the RES-ESS system and whether the energy is from renewable sources. For example, if the BTM load 214 requests energy from only renewable sources, the SOC of a first ESS 216 may be measured by a first SOC meter. If the data from the first SOC meter indicates that the first ESS 216 is at a minimum operating SOC, the switch controller module 222 and/or the voltage controller module 224 may control the flow of energy such that the first ESS 216 is charged only from the RES 208. Then, energy may be delivered from the first ESS 216 to the BTM load 214 with an assurance that the energy is only from renewable sources.

In some embodiments, energy flowing into and out of a first ESS 216 may be monitored over time to ensure that at least as much renewable energy is flowing into the first ESS 216 as energy is flowing out of the first ESS 216. For example, a BTM load may request renewable-only energy, but may allow for net metering of an ESS 216. Thus, even if the ESS 216 stores non-renewable energy, energy may still be allowed to flow from the ESS 216 to the BTM load 214 as long as the cumulative amount of energy flowing into the ESS 216 from the RES 208 equals or exceeds the cumulative amount of energy flowing from the ESS 216 to the BTM load 214, during a time period beginning when the BTM load 214 first requests renewable-only energy. In some embodiments, the time period may begin when the ESS 216 is at its minimum operating SOC. As another example, a first load coupled to the grid 206 may request a first amount of renewable-only energy and a second load coupled to the grid 206 may request a second amount of any-source energy. The inflow/outflow monitor module 226 may monitor the flow meters 210 connected to renewable-only ESSs 216 and the flow meters 210 connected to any-source ESSs to ensure that the flow from the renewable-only ESSs 216 meets or exceeds the renewable-only energy demand from the first load. Thus, even when the energy sources are mixed when delivered to the grid, the net amount of renewable energy delivered to the grid may meet or exceed the amount of requested renewable energy.

The alert generation module 228 may comprise programmable instructions that, upon execution, cause processor 218 to send an alert to a renewable-only energy requester that the RES-ESS system cannot guarantee that energy being delivered is from renewable sources. For example, if the data from the flow meters 210 indicates that the amount of energy flowing from renewable only ESSs 216 plus the amount of energy flowing from the RES does not meet or exceed the renewable-only energy demand, the processor 218 can send an alert (e.g., a string of text, a graphic, an auditory signal, etc.), via the communications interface 234, to the renewable-only energy requester (e.g., to a computer, user interface, mobile device, receiver, speaker etc. of an operator of the renewable-only energy requester). The alert may include a message indicating that the RES-ESS system may not be able to supply sufficient renewable energy to meet the demand. The alert may suggest that the renewable-only energy requester reduces its demanded load or provides an override signal to allow the RES-ESS system to provide non-renewable energy to the requester. The override detection module 230 may comprise programmable instructions that, upon execution, cause processor 218 receive an override request from a renewable-only energy requester. An override request may be sent from the operator (e.g., via a computing device accessed by the operator and via a communications network, such as the Internet) of a renewable-only energy requester via a user interface, or may be an automated message sent from a computer or controller of the renewable-only energy requester. The override request may be received by the processor 218 via the communications interface 234 and may indicate to the processor 218 that the renewable-only energy requester is willing to accept non-renewable energy despite the original request for renewable-only energy. Responsive to receiving the override request, the processor 218 may continue controlling the RES-ESS system to supply energy to the renewable-only energy requester, even if the RES-ESS system cannot guarantee that the energy being delivered is from renewable-only sources. In some cases, the processor 218 may do so by transmitting a message to the renewable-only energy requester indicator indicating an amount of energy the RES-ESS system is providing to the renewable-only energy requester, in some instances the message may indicate the amount of renewable energy the RES-ESS system is providing and/or, separately, the amount of non-renewable energy the RES-ESS system is providing.

Figure 3:
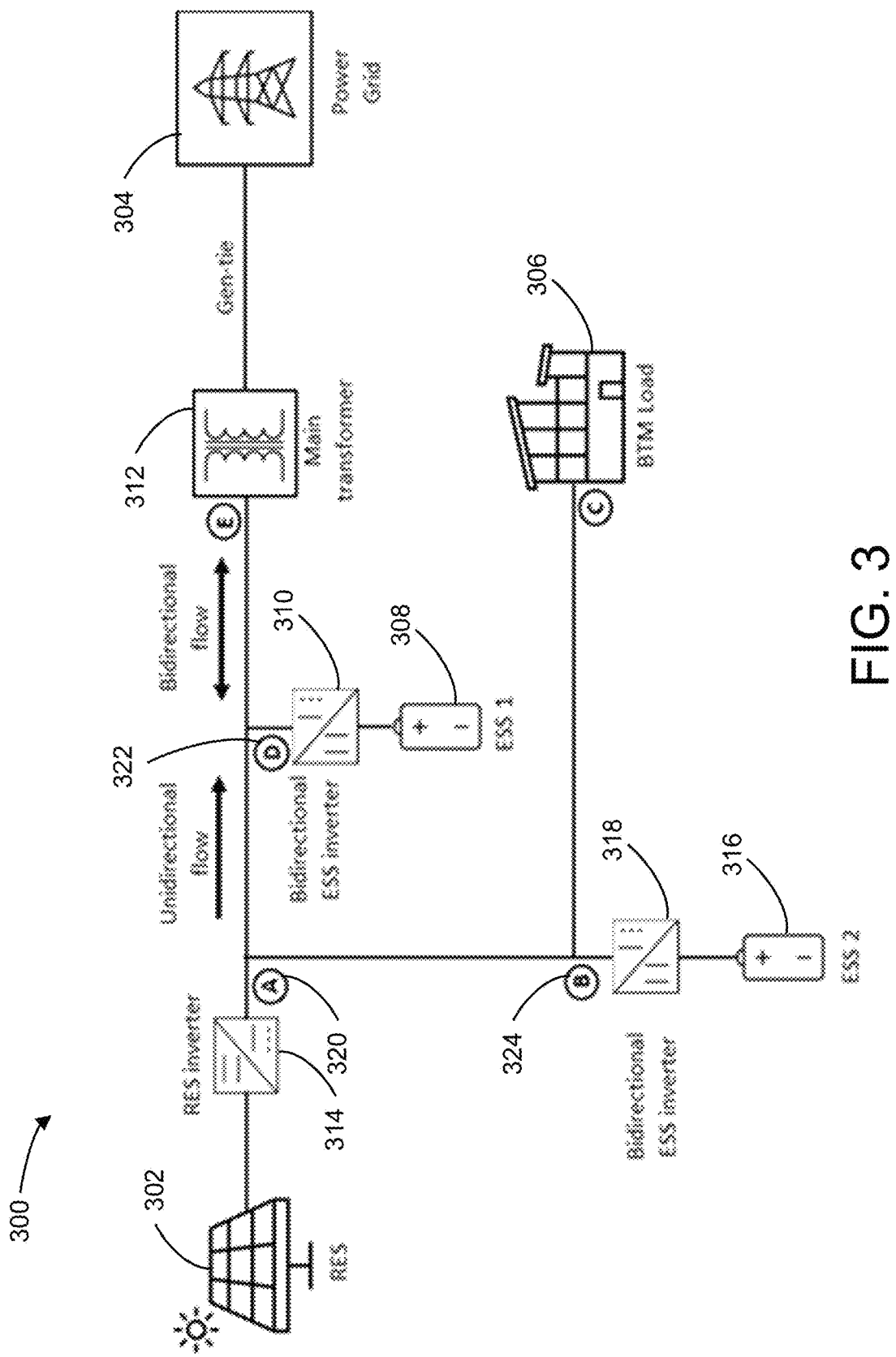
FIGS. 3-8B illustrate a renewable energy source and energy storage system, according to some embodiments.

Referring now to FIG. 3, a diagram of a RES-ESS system 300 is shown, according to some embodiments. RES-ESS system 300 may be configured to allow electrical energy from a renewable energy source 302 (e.g., a PV panel array, a wind turbine array, etc.) and the grid 304 to be stored for later delivery to the grid, while not allowing energy from the grid to reach the BTM load 306. The BTM load 306 may be a source-sensitive destination, to which the operator may require or request that only renewable energy is delivered. Energy generated by the RES 302 and energy from the grid 304 can be delivered to a first ESS 308, which can store the energy for later use. The first ESS 308 may be connected to the grid 304 and the RES 302 through a first bidirectional ESS inverter 310. The first bidirectional ESS inverter 310 can convert AC from the grid 304 and the RES 302 to DC, for example, to charge one or more batteries of the first ESS 308. The first bidirectional ESS inverter 310 can also convert DC from the first ESS 308 to AC for delivery to the grid 304. The first bidirectional ESS inverter 310 may include an inverter for converting DC to AC and a rectifier for converting AC to DC. The RES-ESS system 300 may include a transformer 312 for increasing or decreasing the voltage of electricity being delivered to or from the grid 304. In some embodiments, the electricity generated by the RES 302 may bypass the first ESS 308 and be delivered directly to the grid 304. When the RES 302 is for example, a PV panel array, the RES may produce DC electricity, RES-ESS system 300 may include a RES inverter 314 configured to convert the DC electricity generated by the RES 302 to AC for delivery to the grid 304. In some embodiments, because the RES 302 and the first ESS 308 may both operate on DC electricity, the RES 302 may be coupled to the first ESS 308 without passing through a RES inverter 314 and an ESS inverter 310. The RES 302 and the first ESS 308 may thus share a common inverter (e.g., the ESS inverter 310) for converting the DC from the RES 302 and/or the ESS 308 to AC for delivery to the grid 304. In some embodiments, the electricity generated by the RES 302 may pass through a DC-DC converter to adjust the voltage of the electricity before delivery to the first ESS 308.

The RES-ESS system 300 may further include a second ESS 316 electrically coupled to the RES 302 and the BTM load 306. Similar to the first ESS 308, the second ESS 316 may include a second bidirectional ESS inverter 318. The second ESS inverter 318 can convert AC from the grid 304 and the RES 302 to DC, for example, to charge one or more batteries of the second ESS 316. The first bidirectional ESS inverter 310 can also convert DC from the second ESS 316 to AC for delivery to the grid 304 or the BTM load 306. The electrical connections within the RES-ESS system 300 are arranged such that the electricity generated by the RES 302 can be delivered to a first junction 320 where the electricity can travel in a first direction towards the first ESS 308 and the grid 304 and/or in a second direction towards the second ESS 316 and the BTM load 306. In some embodiments, all of the electricity generated by the RES 302 may be directed in the first direction or the second direction in a given time period, or a portion of the electricity generated by the RES 302 may be directed in each direction. Electricity directed in the first direction reaches a second junction 322, where it can be directed to the grid 304 and/or to the first ESS 308. Electricity directed in the second direction reaches a third junction 324, where it can be directed to the second ESS 316 and/or to the BTM load 306.

The controller 204 may control the components of the RES-ESS system 300 such that electricity can flow from the first junction 320 to the second junction 322, but cannot flow in the reverse direction from the second junction 322 to the first junction. Thus, the second ESS 316 and the BTM load 306 can only receive energy from the RES 302 and can never receive energy from the grid 304 or the first ESS 308. The first ESS 308, on the other hand, can receive energy from the grid 304, the first RES 302, and/or the second ESS 316 and can deliver electricity only to the grid 304. To ensure that electricity cannot flow from the second junction 322 to the first junction 320, the controller 204 may control any inverters or DC-DC converters on the RES-ESS system 300 to maintain the first junction 320 at a higher absolute voltage than the second junction 322, thus establishing a unidirectional flow of energy from the first junction 320 to the second junction 322. This also establishes a unidirectional flow of energy from the second ESS 316 to the first ESS and the grid 304, as no energy can flow from the first ESS 308 or the grid 304 to the second ESS 316 through the unidirectional flow from the first junction 320 to the second junction 322. For example, the controller 204 may control the RES inverter 314 and the first ESS inverter 310 to maintain the first junction 320 at a higher absolute voltage than the second junction 322, so that electricity cannot flow from the second junction 322 to the first junction. This arrangement ensures that the BTM load 306 does not receive any electricity from the grid 304. Instead, the BTM load 306 may receive only renewable energy from the RES 302 (e.g., directly from the RES 302 or indirectly from the RES 302 after being stored in the second ESS 316). The RES-EES system 300 may also cause excess energy stored in the second ESS 316 to be delivered to the grid or the first ESS 308 when needed. For example, if the RES 302 is an array of PV panels and the second ESS 316 may have sufficient capacity to supply twice the electricity needed by the BTM load 306 overnight, the second ESS 316 may deliver half of its stored energy to the grid 304 during the evening when electricity prices are high. The second ESS 316 may then supply the remainder of its stored electricity to the BTM load 306 overnight before the RES 302 begins supplying electricity to the second ESS 316 again the next morning. Meanwhile, the controller 204 may control the first ESS inverter 310 such that the magnitude of the voltage at the second junction 322 can be higher or lower that the magnitude of the voltage at the transformer 312 as needed, thus establishing a bidirectional flow of electricity between the first ESS 308 and the grid 304. Thus, the first ESS 308 can be charged by the RES 302, the grid 304, or the second ESS 316, but can discharge only to the grid 304.

Figure 4:
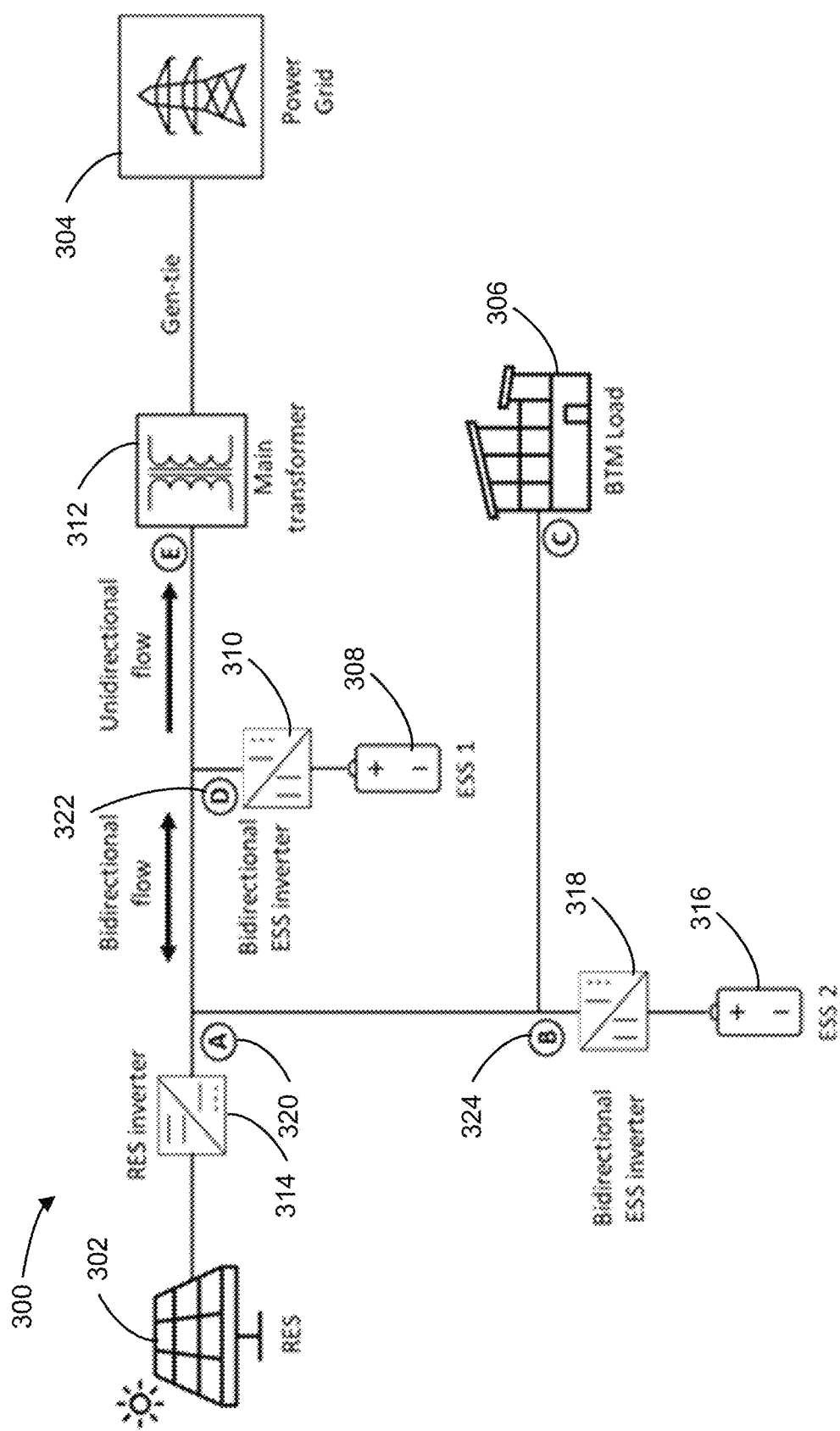

FIG. 4 shows a RES-ESS 300 system 300, according to some embodiments. The RES-ESS system of FIG. 4 is substantially similar to the RES-ESS system 300 of FIG. 3. However, rather than the flow of electricity from the first junction 320 to the second junction 322 being unidirectional (towards the grid 304) the flow of electricity from the second junction 322 to the transformer 312 is unidirectional (towards the grid 304). In these embodiments, the RES 302 can supply electricity to the first ESS 308 and the second ESS 316, and the first ESS 308 and the second ESS 316 can supply electricity to each other. However, the controller 204 may control the first ESS inverter 310 to maintain a voltage higher in magnitude than the voltage at the transformer 312, so that no electricity from the transformer flows to the first ESS 308, the second ESS 316, or the BTM load 306, thus establishing a unidirectional flow. Accordingly, no electricity from the grid 304 can reach the first ESS 308, the second ESS 316, or the BTM load 306, allowing for only renewable energy generated by the RES 302 to reach the BTM load 306.

Figure 5:
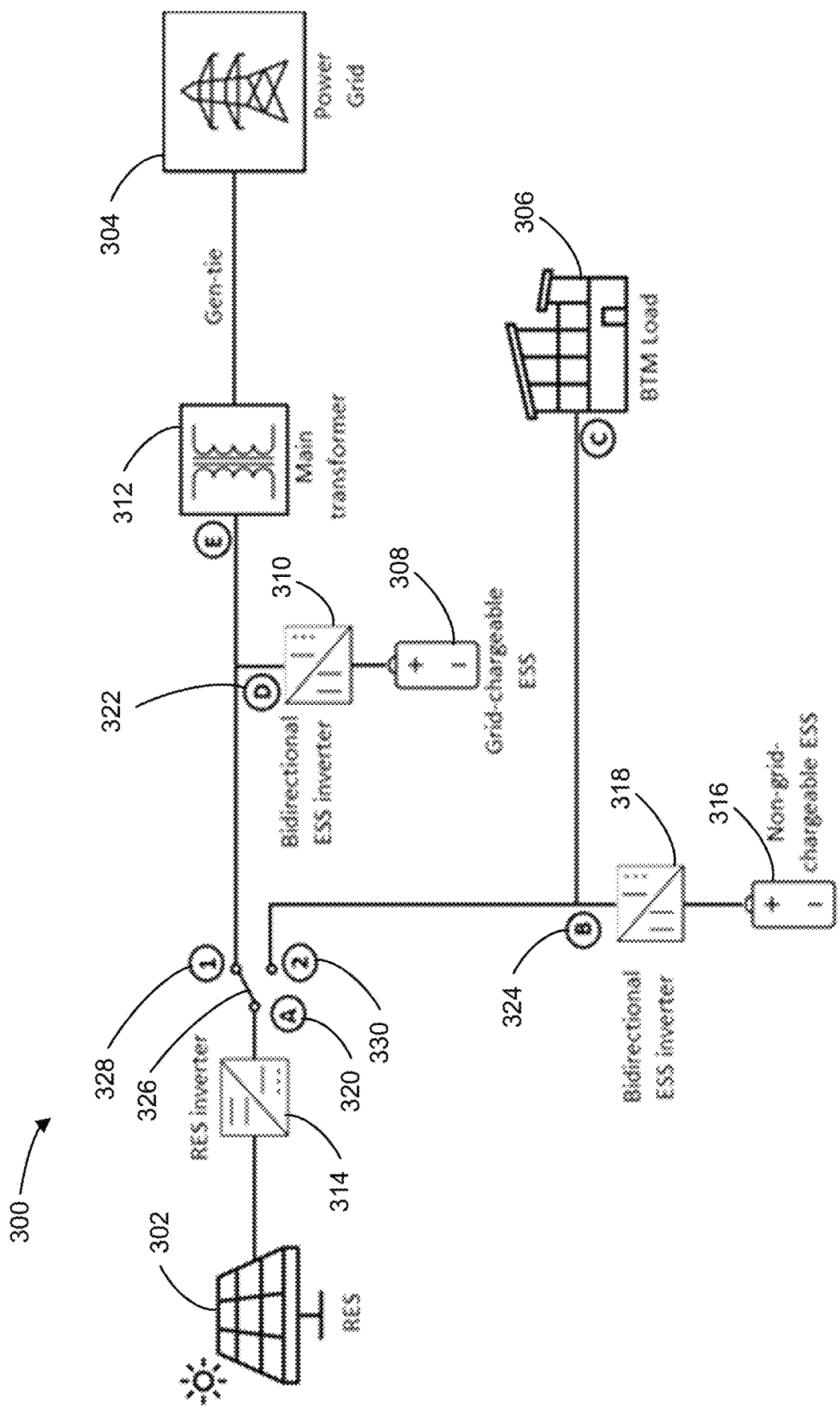

FIG. 5 shows a RES-ESS system 300, according to some embodiments. The RES-ESS system of FIG. 5 may be configured to allow only renewable energy to reach the BTM load 306, which may be a source-sensitive destination. The RES-ESS system of FIG. 5 is substantially similar to the RES-ESS system 300 of FIG. 3. However rather than the controller 204 controlling the flow of electricity by adjusting the voltage of various components of the RES-ESS system 300, the controller may control a switch 326 positioned at the first junction 320. The switch 326 may be positionable between a first position 328 and a second position 330, but not connectable in both positions 328, 330 at the same time. The switch 326 may be a physical switch or an electronic switch. In the first position 328, the switch 326 may electrically couple a first circuit including the RES 302 to the second junction 322, and thereby to the first ESS 308 and the grid 304. In the first position, the RES 302 and the grid 304 can each supply energy to the first ESS 308, and the first ESS 308 can supply energy to the grid 304. In the first position 328, the RES 302, the first ESS, and the grid 304 are all disconnected from the second ESS 316 and the BTM load 306. Accordingly, neither the grid 304, nor the RES 302 can supply energy to the second ESS 316 or the BTM load 306 when the switch 326 is in the first position 328. When the switch 326 is in the second position 330, the RES 320 may be electrically coupled to a second circuit including the second ESS 316 and the BTM load 306. The first ESS 308 and the grid 304 remain disconnected from the second ESS 316 and the BTM load 306. However, the first ESS 308 and the grid 304 remain connected, so that electricity can be supplied from the grid 304 to the first ESS 308 and from the first ESS 308 to the grid 304. The switch 326 thus allows energy to be supplied to the first ESS 308 from both the RES 302 and the grid 304, but allows energy to be supplied to the second ESS and the BTM load 306 only from the RES. The grid 304 and the first ESS 308 can never be connected to the second ESS 316 and the BTM load 306, ensuring that only renewable energy from the RES 302 reaches the BTM load 306. The switch 326 ensures that the electrical path leading to the first ESS 308 and the grid 304 is never connected to the electrical path leading to the second ESS 316 and the BTM load 306. The controller 204 may move the switch between the first position 328 and the second position 330 occasionally (e.g., every few hours, or every few days, or even every few months) or rapidly (e.g., every few minutes, every few seconds, multiple times per second). In rapid operation the switch 326 would effectively time-share the RES 302 between the first position 328, supplying energy to the first ESS 308 and/or the grid 304, and the second position 330, supplying energy to the second ESS 316 and/or the BTM load 306. The RES-ESS 300 may include additional components to smooth the power transients that could result from rapid switching. Rapid switching may have the effect of allowing the RES 302 to supply energy to both circuits near-simultaneously and near-continuously, while nevertheless preventing any electricity flow from the grid 304 to the BTM load 306. Thus, the system 300 of FIG. 5 may ensure that any energy flowing to the BTM load 306 has been generated from renewable sources.

Figure 6:
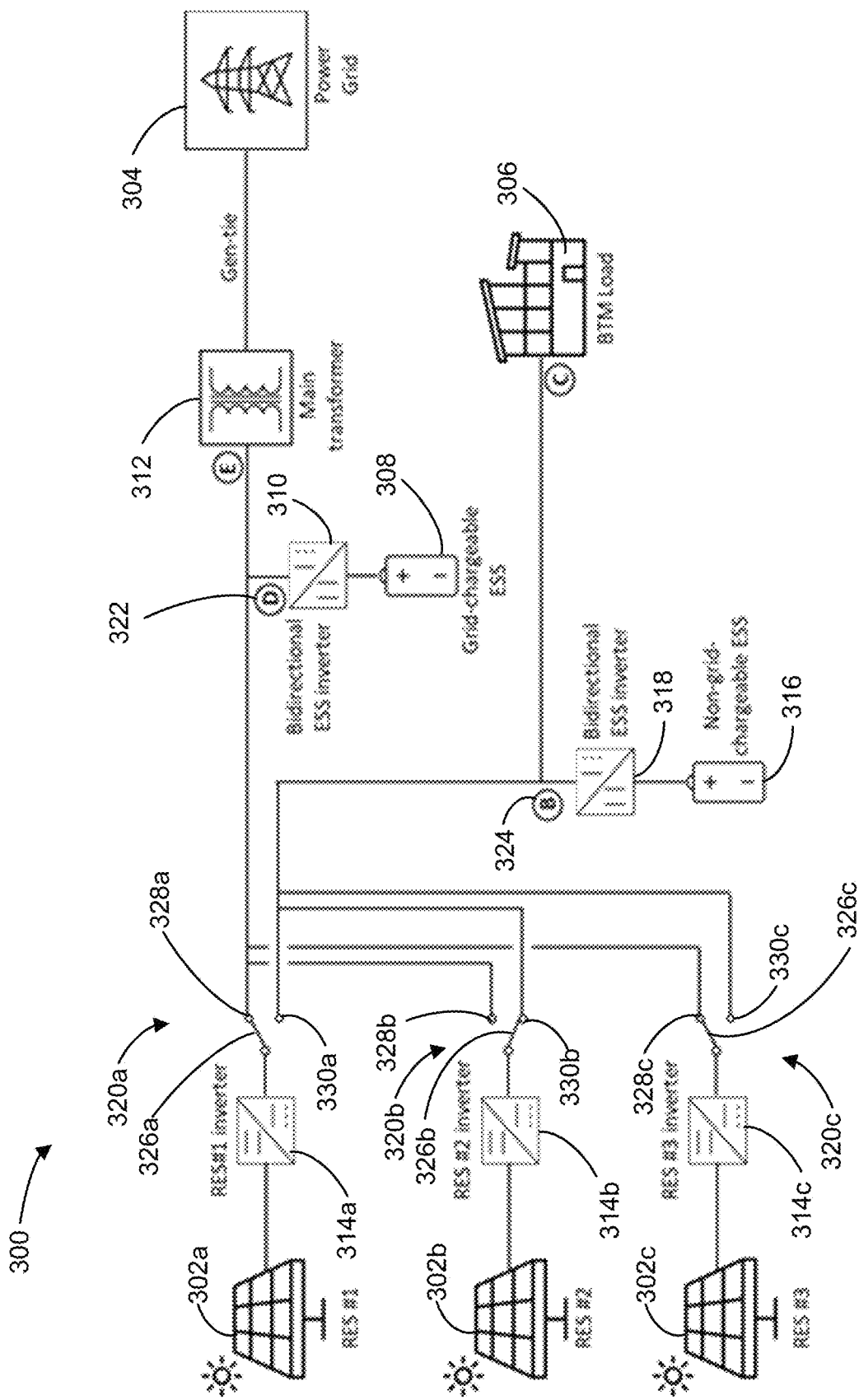

FIG. 6 shows a RES-ESS system 300, according to some embodiments. The RES-ESS system of FIG. 6 may be configured to allow only renewable energy to reach the BTM load 306, which may be a source-sensitive destination. The RES-ESS system of FIG. 6 is substantially similar to the RES-ESS system 300 of FIG. 5. However, the RES-ESS system 300 of FIG. 6 includes multiple RESs 302a-c, each with a corresponding switch 326a-c. The switches 326a-c may operate substantially similarly to the switch 326 shown in FIG. 5. That is, each switch 326a-c is positionable between a first position 328a-c, in which the respective RES 302a-c is electrically coupled to the first ESS 308 and/or the grid 304, and a second position 330a-c in which the respective RES 302a-c is coupled to the second ESS 316 and/or the BTM load 306. Because there are multiple RESs 302a-c, the switch of one or more RESs 302a-c can be in the first position 328a-c, while the switch of one or more RESs 302a-c is in the second position 330a-c. For example, as shown in FIG. 6, the first switch 326a and the third switch 326c are in the respective first positions 328a, 328c, connecting the first RES 302a and the third RES 302c to the first ESS 308 an/or the grid 304. At the same time, the second switch 326b is in the respective second position 330b, connecting the second RES 302b to the second ESS 316 and/or the BTM load 306. Thus, collectively, the RESs 302a-c may supply energy simultaneously to the first ESS 308 and the grid 304 and to the second ESS 316 and the BTM load 306. The multiple RESs 302a-c may be, for example, subsections of a larger PV panel array. In some embodiments, each PV panel may be a separate RES 302a-c with its own switch 326a-c. For example, in an array of 1000 PV panels, the amount of energy supplied to each circuit can be adjusted to the tenth of a percent of the total energy generated by the array, assuming an equal amount of energy generated by each panel. The switches 326a-c ensure that the circuits remain separated so that no energy can ever flow from the grid 304 to the BTM load 306 or the second ESS 316. Thus, the system 300 of FIG. 6 may ensure that any energy flowing to the BTM load 306 has been generated from renewable sources.

In some embodiments, multiple RESs 302a-302c may be referred to collectively as components of a single RES. Similarly, in some embodiments, multiple ESSs 308, 316 may be referred to collectively as components of a single ESS.

Figure 7:
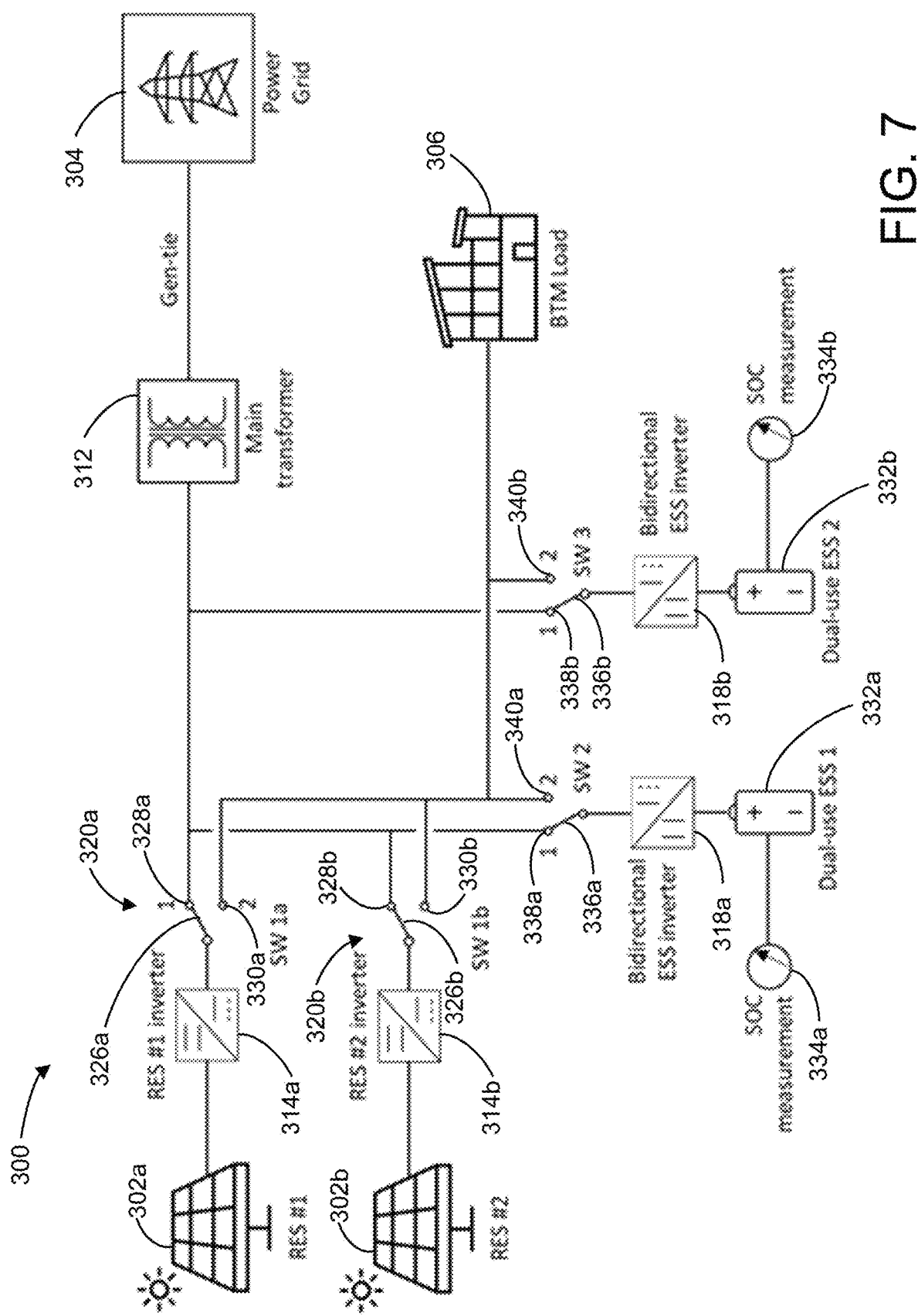

FIG. 7 shows a RES-ESS system 300, according to some embodiments. The RES-ESS system of FIG. 7 is similar to the RES-ESS system 300 of FIG. 6. The RES-ESS system 300 of FIG. 7 includes multiple dual-use ESSs 332a, 332b, each connected to the rest of the RES-ESS system 300 by a respective ESS switch 336a, 336b. Each ESS switch 336a, 336b, is positionable between a first respective position 338a, 338b and a second respective position 340a, 340b. Using the switch 336a as an example, in the first position 338a, the ESS switch 336a electrically couples the dual-use ESS 332a to a first circuit including the first position 328a of the first RES switch 326a, the first position 328b of the second RES switch 326b and the transformer 312, and thereby the grid 304. In the second position 340a, the ESS switch 336a electrically couples the dual-use ESS 332a to the second position 330a of the first RES switch 326a, the second position 330b of the second RES switch 326b, and the BTM load 306.

The RES-ESS system 300 shown in FIG. 7 enables several operational modes depending on the positions of the switches 326a, 326b, 336a, 336b. These modes are described below.

In a first mode, the RES switches 326a, 326b are in the first position 328a, 328b, the first ESS switch 336a is in the first position 338a, and the second ESS switch 336b is in the first position 338b. In the first mode, the RESs 302a, 302b and the dual-use ESSs 332a, 332b may be coupled to each other and the grid 304. Thus, the dual-use ESSs 332a, 332b may be charged by the grid 304 and/or the RESs 302a, 302b, and/or may discharge to the grid 304. The BTM load 306 is disconnected from the RESs 302a, 302b, the dual-use ESSs 332a, 332b, and the grid 304.

In a second mode, the RES switches 326a, 326b are in the first position 328a, 328b, the first ESS switch 336a is in the second position 340a, and the second ESS switch 336b is in the first position 338b. In the second mode, the RESs 302a, 302b and the second dual-use ESS 332b may be coupled to each other and the grid 304. Thus, the second dual-use ESSs 332b may be charged by the grid 304 and/or the RESs 302a, 302b, and/or may discharge to the grid 304. The first dual-use ESS 332a, with the first ESS switch 336a in the second position 340a is electrically coupled to the BTM load 306, and is fully decoupled from the RESs 302a, 302b and the grid 304. Thus, the first dual-use ESS 332a can only discharge to the BTM load 306 in the second mode.

In a third mode, the RES switches 326a, 326b are in the first position 328a, 328b, the first ESS switch 336a is in the first position 338a, and the second ESS switch 336b is in the second position 340b. In the third mode, the RESs 302a, 302b and the first dual-use ESS 332a may be coupled to each other and to the grid 304. Thus, the first dual-use ESSs 332a may be charged by the grid 304 and/or the RESs 302a, 302b, and/or may discharge to the grid 304. The second dual-use ESS 332b, with the second ESS switch 336b in the second position 340b is electrically coupled to the BTM load 306, and is fully decoupled from the RESs 302a, 302b and the grid 304. Thus, in the third mode, the second dual-use ESS 332b can only discharge to the BTM load 306. The third mode is substantially similar to the second mode, except that the second dual-use ESS 332b is coupled to the BTM load 306 rather than the first dual use ESS 332a being coupled to the BTM load 306.

In a fourth mode, the RES switches 326a, 326b are in the second position 330a, 330b, the first ESS switch 336a is in the second position 340a, and the second ESS switch 336b is in the first position 338b. In the fourth mode, the RESs 302a, 302b and the first dual-use ESS 332a may be coupled to each other and to the BTM load 306, while being disconnected from the grid 304. Thus, the first dual-use ESSs 332a may be charged by the RESs 302a, 302b, and/or the RESs 302a, 302b and the first dual-use ESS 332a may supply energy to the BTM load 306. The second dual-use ESS 332b, with the second ESS switch 336b in the first position 338b is electrically coupled to the grid 304, and is fully decoupled from the RESs 302a, 302b and the BTM load 306. Thus, in the fourth mode the second dual-use ESS 332b can only be charged by and/or discharge to the grid 304.

In a fifth mode, the RES switches 326a, 326b are in the second position 330a, 330b, the first ESS switch 336a is in the first position 338a, and the second ESS switch 336b is in the second position 340b. In the fifth mode, the RESs 302a, 302b and the second dual-use ESS 332b may be coupled to each other and to the BTM load 306, while being disconnected from the grid 304. Thus, the second dual-use ESSs 332b may be charged by the RESs 302a, 302b, and/or the RESs 302a, 302b and the second dual-use ESS 332b may supply energy to the BTM load 306. The first dual-use ESS 332a, with the first ESS switch 336a in the first position 338a is electrically coupled to the grid 304, and is fully decoupled from the RESs 302a, 302b and the BTM load 306. Thus, in the fifth mode the first dual-use ESS 332a can only be charged by and/or discharge to the grid 304. The fifth mode is substantially similar to the fourth mode, except that the second dual-use ESS 332b is coupled to the BTM load 306 rather than the first dual use ESS 332a being coupled to the BTM load 306.

In a sixth mode, the RES switches 326a, 326b are in the second position 330a, 330b, the first ESS switch 336a is in the first position 338a, and the second ESS switch 336b is in the first position 338b. In the sixth mode, the RESs 302a, 302b are electrically coupled to the BTM load 306 and decoupled from the dual-use ESSs 332a, 332b and the grid 304. Thus, the RESs 302a, 302b may only supply electricity directly to the BTM load 306. The dual-use ESSs 332a, 332b are electrically connected only to each other and to the grid 304. Thus, in the sixth mode, the dual-use ESSs 332a, 332b may only be charged by and/or discharge to the grid 304.

In a seventh mode, the RES switches 326a, 326b are in the first position 328a, 328b, the first ESS switch 336a is in the second position 340a, and the second ESS switch 336b is in the second position 340b. In the seventh mode, the RESs 302a, 302b are electrically coupled to the grid 304 and decoupled from the dual-use ESSs 332a, 332b and the BTM load 306. Thus, the RESs 302a, 302b may only supply electricity directly to the grid 304. The dual-use ESSs 332a, 332b are electrically connected only to each other and to the BTM load 306. Thus, in the seventh mode, the dual-use ESSs 332a, 332b may only discharge to the BTM load 306, and cannot be charged by the grid 304 or the RESs 302a, 302b.

In an eighth mode, the RES switches 326a, 326b are in the second position 330a, 330b, the first ESS switch 336a is in the second position 340a, and the second ESS switch 336b is in the second position 340b. In the eighth mode, the RESs 302a, 302b are electrically coupled to the BTM load 306 and the dual-use ESSs 332a, 332b. Thus, the RESs 302a, 302b may only supply electricity to the dual-use ESSs 332a, 332b and the BTM load 306, and the dual-use ESSs 332a, 332b can only supply electricity to each other or to the BTM load 306. The grid 304 is disconnected from both the RESs 302a, 302b and the dual-use ESSs 332a, 332b.

In each of the modes described above, both RES switches 326a, 326b are described as being in the same position at the same time. However, in some embodiments, one RES switches 326a, 326b may be in a respective first position 328a, 328b, while the other RES switch 326a, 326b may be in a respective second position 330a, 330b. Thus, the RES-ESS system 300 may be operated in multiple modes simultaneously. Further, the RES-ESS system 300 is not limited to two RESs 302a, 302b or two ESSs 332a, 332s, but may have any number of each, depending on the size and operational requirements of the RES-ESS system 300.

In the RES-ESS system 300 of FIG. 7, the dual-use ESSs 332a, 332b are both capable of being charged by the RESs 302a, 302b and the grid 304, and are both capable of discharging to the grid 304 and the BTM load 306. To ensure that no energy from the grid 304 reaches the BTM load 306, the state of charge (SOC) of each dual-use ESS 332a, 332b may be measured and monitored. Each dual-use ESS 332a, 332b may include an internal SOC monitoring system or may be coupled to an external SOC monitoring system 334a, 334b. The state of charge monitoring system may include, for example, a voltmeter and/or an ammeter. The controller 204 may continuously or periodically receive the measured SOC for each dual-use ESS 332a, 332b and may control the operation of the switches 326a, 326b, 336a, 336b based on the monitored state of charge. The controller 204 may only allow one of the dual-use ESSs 332a, 332b to discharge to the BTM load 306 when it has been determined that that dual-use ESS 332a, 332b was not charged at all by the grid 304. For example, when the first ESS switch 336a is in the first position 338a and connected to the grid 304, the controller 204 may only allow the first ESS switch 336a to switch to the second position 340a when the SOC monitoring system 334a indicates that the first dual-use ESS 332a is at minimum operating SOC and cannot be discharged further. This ensures that no charge from the grid 304 remains in the first dual-use ESS 332a when the first dual-use ESS 332a is connected to the BTM load 306. While the first ESS switch 336a remains in the second position 340a, the first dual-use ESS 332a remains disconnected from the grid 304, and can only receive energy from the RESs 302a, 302b and discharge to the BTM load 306. Because discharging energy generated by the RESs 302a, 302b from the dual-use ESSs 332a, 332b to the grid 304 is not a concern, the controller 204 can switch the ESS switches 336a, 336b back to their respective second position 340a, 340b at any time, regardless of the SOCs.

In some embodiments, the SOC monitoring systems 334a, 334b may track the cumulative energy flow into and out of the respective dual-use ESSs 332a, 332b once the respective ESS switches 336a, 336b have been switched into the second positions 340a, 340b. In these embodiments, the ESS switches 336a, 336b may be switched into the second positions 340a, 340b when the respective SOCs are higher than the minimum operating SOC. For example, the first ESS switch 336a may be switched from the first position 338a to the second position 340a when the first dual-use ESS 332a is at a fifty percent SOC. The SOC monitoring system 334 may monitor the inflows and outflows of energy from the first dual-use ESS 332a starting when the first ESS switch 336a switches to the second position 340a, for example, using an ammeter. The controller 204 may track these inflows and outflows and may stop the first dual-use ESS 332a from supplying energy to the BTM load 306 when the cumulative inflow from the RES 302 no longer exceeds the cumulative outflow to the BTM load 306. For example, the controller 204 may determine that, beginning when the first ESS switch 336a switches to the second position 340a, 400 kWh have flowed into the first dual-use ESS 332a from the RESs 302a, 302b and 300 kWh have flowed out of the first dual-use ESS 332a. The controller 204 may continue to allow the first dual-use ESS 332a to continue supplying energy to the BTM load 306 until the 400 kWh of cumulative energy outflow is reached and the outflow equals the inflow. If the controller 204 detects additional inflow from the RESs 302a, 302b, more energy may be allowed to flow out from the first dual-use ESS 332a. When the first ESS switch 336a switches to the first position 338a and then back to the second position 340a, the controller may reset the cumulative inflow and outflow measurements. This ensures that no more energy than is supplied to the dual-use ESSs 332a, 332b by the RESs 302a, 302b can be delivered to the BTM load 306.

In one example, the controller 204 may send a signal to the first RES switch 326a to switch from the first position 328a to the second position 330a. At a first time, the controller 204 may send a signal to the first ESS switch 336a to switch from the first position 336a to the second position 328a. At the time the ESS switch 336a is switched (e.g., at the first time), the controller may receive a first measured SOC from the first SOC monitoring system 334a. At a later, second time, the controller may receive a second measured SOC from the first SOC monitoring system 334a. If the second measured SOC exceeds the first measured SOC, the controller may allow an amount of energy to flow to the BTM load 306 from the first ESS 332a to the BTM load 306 that does not exceed the difference between the first measured SOC and the second measured SOC. If the second measured SOC does not exceed the first measured SOC, the controller may disable the flow of energy from the first ESS 332a to the BTM load 306. For example, the controller 204 may reduce the voltage at the inverter 318a to be lower than the voltage at the BTM load 306, such that energy cannot flow from the first ESS 332a to the BTM load 306. In some embodiments, the controller 204 may disable the flow of energy from the first ESS 332a to the BTM load 306 by moving the first ESS switch 336a to a neutral position in which it is not connected to the first circuit or the second circuit. It should be understood that any system or method disclosed herein in which the SOC of an ESS or the flow of energy in the system is monitored may take into account energy losses due to inefficiency of the ESS. Thus, for example, in a system that is 90% efficient, an ESS receiving 100 kWh of renewable energy may only be configured to store and deliver 90 kWh of renewable energy to a BTM load before the flow of energy from the ESS to the BTM load is ceased. The efficiency of the system may be calculated using the formulas below. The variables may be defined as follows:

$E_{RES}(t)$=cumulative energy from the RES, used to charge the ESS between the reference time and time t, after accounting for estimated energy losses in the ESS.

$E_{grid}(t)$=cumulative energy from the grid, used delivered to the ESS from the grid, used to charge the ESS between the reference time and time t, after accounting for estimated energy losses in the ESS.

$E_{ssd}(t)$=cumulative energy delivered from the ESS to the source-sensitive destination, between the reference time and time t.

$E_{other}(t)$=cumulative energy delivered from the ESS to the non-source-sensitive destination, between the reference time and time t.

S(t)=energy stored in the ESS at time t $S_{RES}(t)$=energy stored in the ESS at time t, that was generated by the RES $S_{grid}(t)$=energy stored in the ESS at time t, that was sourced from the grid.

η=efficiency of the ESS

The amount of energy stored in the ESS at time t may be calculated as follows:

$$S(t)=\eta \times \{E_{RES}(t)+E_{grid}(t)\}-\{E_{ssd}(t)+E_{other}(t)\}$$

This formula may be rewritten to solve for the efficiency η of the ESS:

$$\eta=[S(t)+\{E_{ssd}(t)+E_{other}(t)\}]/\{E_{RES}(t)+E_{grid}(t)\}$$

Because, the S(t), $E_{ssd}(t)$, $E_{other}(t)$, $E_{RES}(t)$, and $E_{grid}(t)$ can all be measured, the efficiency η of the ESS can be calculated. The calculated efficiency η may then be used to calculate the renewable energy and grid energy stored in the ESS using the following formulas:

$$S_{RES}(t)=\eta \times E_{RES}(t)-E_{ssd}(t)$$

$$S_{grid}(t)=\eta \times E_{grid}(t)-E_{other}(t)$$

Figure 8A:
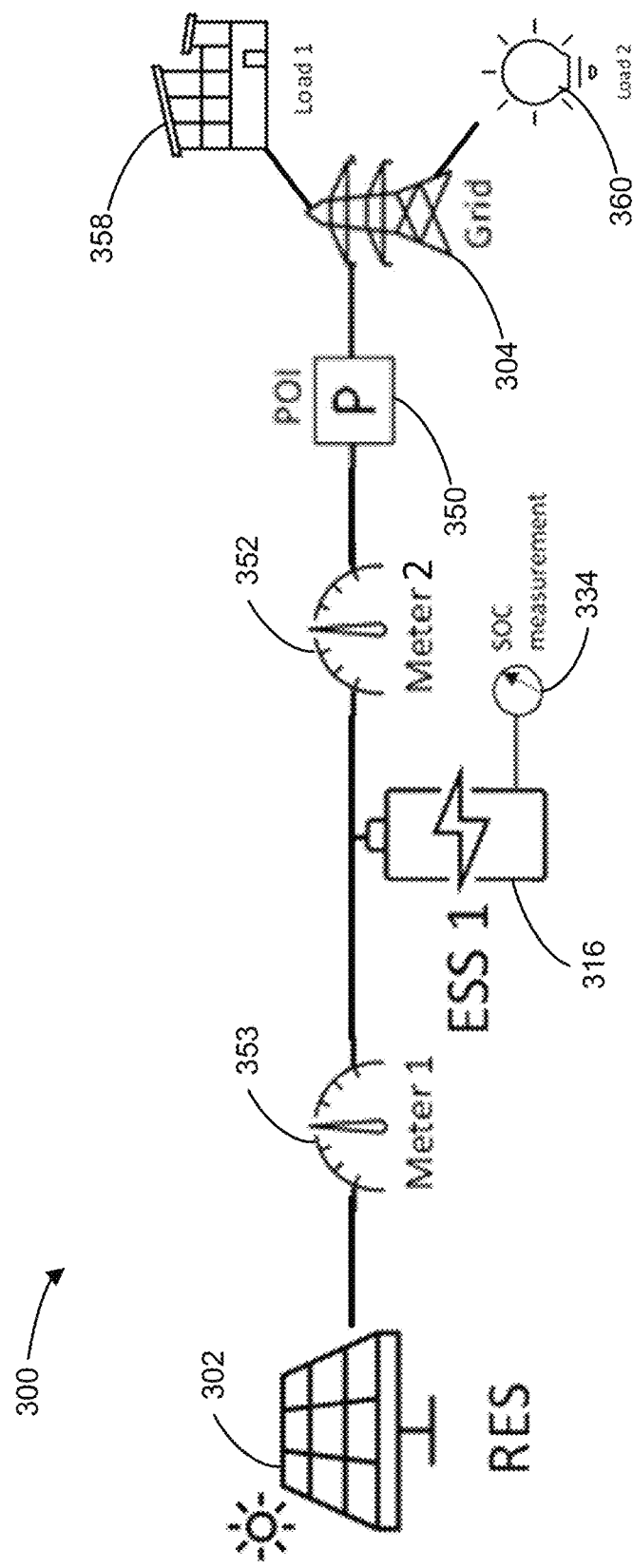

FIG. 8A shows a RES-ESS system 300, according to some embodiments. The RES-ESS system 300 includes a RES 302 configured to generate renewable energy. The RES-ESS system 300 also includes an ESS 316 configured to store energy. The ESS 316 may be electrically coupled both to the RES 302 and to an electrical grid 304 via a point of interconnection (POI) 350. The ESS 316 may be configured to receive and store energy from the RES 302 and to receive and store energy from the grid 304. The ESS 316 may also be configured to deliver stored energy to the grid 304. The RES 302 may be configured to deliver energy directly to the grid 304. The RES-ESS system 300 may include a first meter 353 configured to measure the flow of energy from the RES 302 to the ESS 316 and/or the POI 350, and thereby the grid 304. The RES-ESS system 300 may include a second meter 352 configured to measure the flow of power between the ESS 316 and/or the RES 352 and the POI 350. The RES-ESS system 300 may include a SOC monitoring system 334 configured to measure the state of charge of the ESS 316. Using the meters 352, 353 and/or the SOC monitoring system 334 the flow of power in the RES-ESS system 300 may be measured and the amount of renewable energy in the ESS 316 may be determined.

In some embodiments, the amount of renewable energy and non-renewable energy in the ESS 316 may be monitored at all times using the SOC monitoring system 334 and the meters 352, 353. For example, as the ESS 316 is being charged, the SOC of ESS 316 may be monitored as the flow from the RES 302 and the grid 304 are being measured. If the first meter 353 and the second meter 352 indicate that the same amount of energy is flowing towards the ESS 316, for example, and the SOC of the ESS 316 increases from 0% to 50%, it may be determined that 25% of the SOC is from the RES 302, and therefore from renewable sources, and that 25% of the SOC is from the grid 304, and therefore from nonrenewable or mixed sources. If, after the ESS 316 has been charged to 50%, the second meter 352 indicates that the grid 304 has stopped supplying energy to the ESS 316, the first meter 353 indicates that energy is still flowing from the RES 302, and the SOC monitoring system 334 indicates that the SOC of the ESS 316 has increased to 100%, it may be determined that 75% of the SOC is from renewable sources and 25% of the SOC is from non-renewable or mixed sources. Then, when the grid 304 or a load (e.g., source-sensitive destination 358) connected to the grid 304 requests energy from only renewable sources, measurements from the SOC monitoring system 334 and the meters 352, 353 may be used to monitor the amount of available renewable energy. For example, if the first meter 353 indicates that no energy is flowing from the RES 302 and the second meter 352 indicates that energy is flowing to the POI 350, it may be determined that all of the energy flowing to the POI 350 is from the ESS 316. When the grid 304 requests only renewable energy, the ESS 316 may only deliver 75% of its SOC to the grid 304 because only 75% of the SOC of the ESS 316 is guaranteed to be from renewable sources. While the energy stored in the ESS 316 is mixed renewable and non-renewable energy, monitoring the SOC in this way ensures that at least as much renewable energy has been delivered to the ESS 316 as energy from any source is delivered to the grid from the ESS.

If, for example a source-sensitive destination 358 requests a first amount of energy from the grid 304 and a non-source-sensitive destination 360 requests a second amount of energy from the grid, the RES-ESS system 300 may deliver energy to the grid 304 to fill both requests. The RES-ESS system 300 may monitor the SOC and the flow of energy in the meters 352, 353 to determine an amount of renewable energy being delivered to the grid 304. If, as discussed above, it is determined that the ESS 316 is at 100% SOC, with 75% of the SOC being from renewable sources and 25% of the SOC being from non-renewable or mixed sources, the source-sensitive destination 358 requests 75% of the total energy demand of the grid 304, and the non-source sensitive destination 360 requests 25% of the total energy demand, all of the energy stored in the ESS may be delivered to the grid 304. If instead the source-sensitive destination 358 requests 80% of the total energy demand of the grid 304, the amount of energy delivered to the grid 304 must be monitored, as the net renewable energy stored in the ESS 316 will be consumed by the source-sensitive destination 358 before the SOC of the ESS 316 reaches 0%. Upon determining that the renewable energy originally stored in the ESS (plus the amount of renewable energy that may have been added during a first time period in which energy is being delivered to the grid 304) minus the first energy output to the source-sensitive destination is zero or less than zero, the RES-ESS system 300 may cease to send energy from the RES-ESS system 300 to the source-sensitive destination 358. The RES-ESS system 300 may alternatively, or additionally send a notification or alert to the source-sensitive destination 358 indicating that any energy supplied is not guaranteed to be from renewable sources. The RESS-ESS system 300 may continue to send any energy still stored in the ESS 316 to the non-source-sensitive destination 360.

In some embodiments, the SOC monitoring system 334 may not be included and the meters 352, 353 may be used to determine the flow of renewable and nonrenewable energy to the grid 304. For example, when a request for renewable only energy is received, the RES-ESS system 300 (e.g., the controller 204 of the RES-ESS system 300) may begin to track the flow of energy through the meters 352, 353. Energy initially stored in the ESS 316 may be assumed to be from non-renewable or mixed sources. Once the flow of energy through the meters 352, 353 begins being tracked, the RES-ESS system 300 may be controlled such that the cumulative amount of energy flowing through the second meter 352 to the grid does not exceed the cumulative amount of energy flowing through the first meter 353 from the RES 302. Thus, at any time once monitoring has begun, at least as much energy will have flowed from the RES 302 to the grid 304 and/or the ESS 316 as will have flowed from the RES 302 and or the ESS 316 to the grid 304. This may ensure that at least as much renewable energy is being produced by the RES 302 as is being demanded by the grid 304. If it is ever determined that the RES-ESS system 300 cannot guarantee that at least as much renewable energy is being supplied as demanded, a message or alert indicating this may be sent to the grid 304 or a load connected to the grid 304 and/or the RES ESS system 300 may cease to send energy to the grid 304.

Figure 8B:
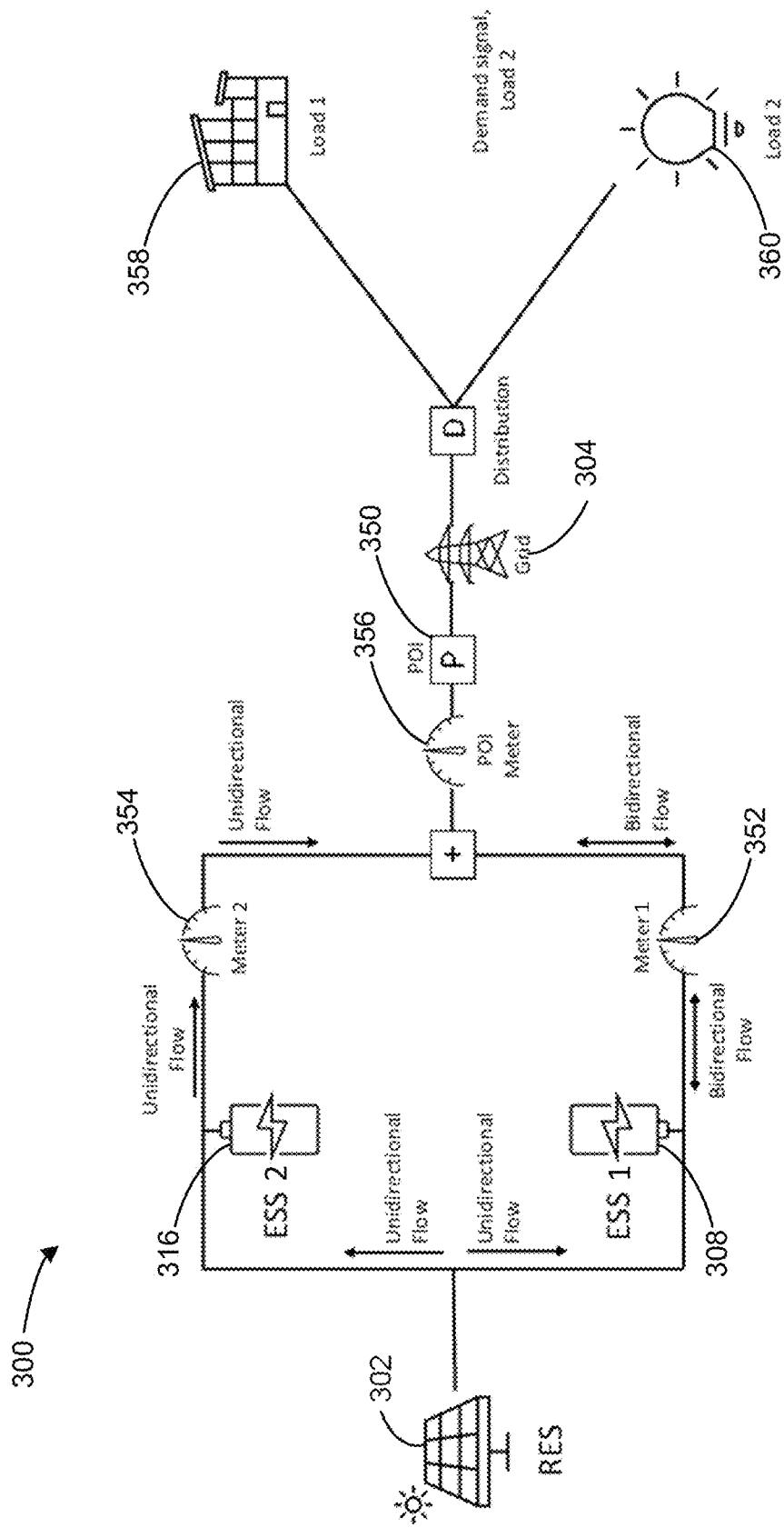

FIG. 8B shows a RES-ESS system 300, according to some embodiments. The RES-ESS system 300 includes a RES 302 configured to generate renewable energy. The renewable energy may be directed toward a lower (as shown) electrical branch including a first ESS 308 and/or toward an upper (as shown) electrical branch including second ESS 316. In some embodiments, the renewable energy may bypass the ESSs 308, 316 and be delivered directly to the grid 304 via a point of interconnection (POI) 350. The point of interconnection 350 may include a transformer configured to adjust the voltage of alternating current as it is delivered to or from the grid 304. Though not shown in FIG. 8B, the RES-ESS system 300 may include inverters to convert AC to DC and vice versa and/or DC-DC converters to adjust the DC voltage between components of the system. Using the methods described above with regard to FIGS. 3 and 4, a bidirectional flow of energy may be established between the first ESS 308 and the POI 350, and a unidirectional flow of energy may be established from the second ESS 316 to the POI 350. In some embodiments, a unidirectional flow of energy may also be established from the second ESS to the first ESS. The first ESS 308 may be referred to as a mixed energy storage, as it can store energy from the RES 302 and from the grid 304. The second ESS may be referred to as a renewable energy-only storage, as it only stores energy from the RES 302. The RES-ESS system 300 further includes a first meter 352 configured to measure the flow of energy from the first ESS 308 and the RES to the POI 350 and from the POI 350 (and in some embodiments, the second ESS 316) to the first ESS 308. The RES-ESS system 300 also includes a second meter 354 configured to measure the flow of energy from the second ESS 316 and the RES 302 to POI 350. In some embodiments, the RES-ESS system 300 may include a POI meter 356 configured to measure the flow of energy from the POI 350 to the ESSs 308, 316 and from the ESSs 308, 316 and the RES 302 to the POI 350. The meters 352, 354, 356 may be configured to measure both the amount of energy flow and the direction of flow.

When the operator of the grid 304 requires that only renewable energy is delivered to the grid 304, the readings from the meters 352, 354, 356 may be used to ensure that only renewable energy from the RES 302 and/or the second ESS 316 is delivered to the POI 350. For example, if the grid operator requires that only renewable energy is delivered to the grid 304, a controller (e.g., controller 204) may control the components of the RES-ESS system 300 such that energy flows only from the upper electrical branch (e.g., from the RES 302 and the second ESS 316) to the POI 350, and that no energy is delivered from the first ESS 308 to the POI 350. Energy may still flow from the RES 302 to the first ESS 308, either directly via the lower (as shown) electrical branch or around the upper (as shown) electrical branch to the POI side of the lower branch, as long as no energy is delivered from the lower branch to the POI 350.

The controller 204 may monitor the meters 352, 354, 356 to confirm that no energy is being delivered from the first ESS 308 to the POI. The controller 204 may, for example, receive signals from the meters 352, 354, 356 via the communications interface 234 indicating measurements (e.g., voltage measurements, current measurements, etc.) made by the meters 352, 354, 356. The controller 204 may receive the signals in response to polling the meters 352, 354, 356, and/or in response to the meters 352, 354, 356 automatically sending the signals. The controller 204 and/or the meters 352, 354, 356 may communicate in this manner at set intervals, upon receipt of a request, and/or pseudo-randomly. For example, when the renewable-only energy is requested, the controller 204 may stop delivering energy or may send a message to the grid operator if the first meter 352 detects that energy is flowing towards the POI. As an additional confirmation that no energy is flowing from the first ESS 308 to the POI 350, the readings from the second meter 354 may be compared to the readings from the POI meter 356. If the readings indicate that more energy is flowing through the POI meter 356 in the direction of the POI 350 than is flowing through the second meter 354 toward the POI 350, the controller may determine that energy must be flowing from the lower electrical branch and may stop delivering energy or send a message to the grid operator. Thus, even if the first meter 352 malfunctions, energy flow from the first ESS 308 to the POI 350 may still be detected.

In some embodiments, the grid 304 may be configured to deliver energy to a source-sensitive destination 358 and a non-source-sensitive destination 360. The controller 204 may determine whether the total amount of energy measured at the second meter 354 equals or exceeds the amount of energy demanded by the source-sensitive destination 358. If it does not, a notification may be sent to the source-sensitive destination 358 that the delivered energy is not guaranteed to be from renewable energy sources. In some embodiments, the RES-ESS system 300 may reduce the amount of energy sent to the source-sensitive destination 358 to an amount equal to or below the amount of energy measured by the second meter 354 or may stop supplying energy to the source-sensitive destination 358 entirely.

Figure 9:
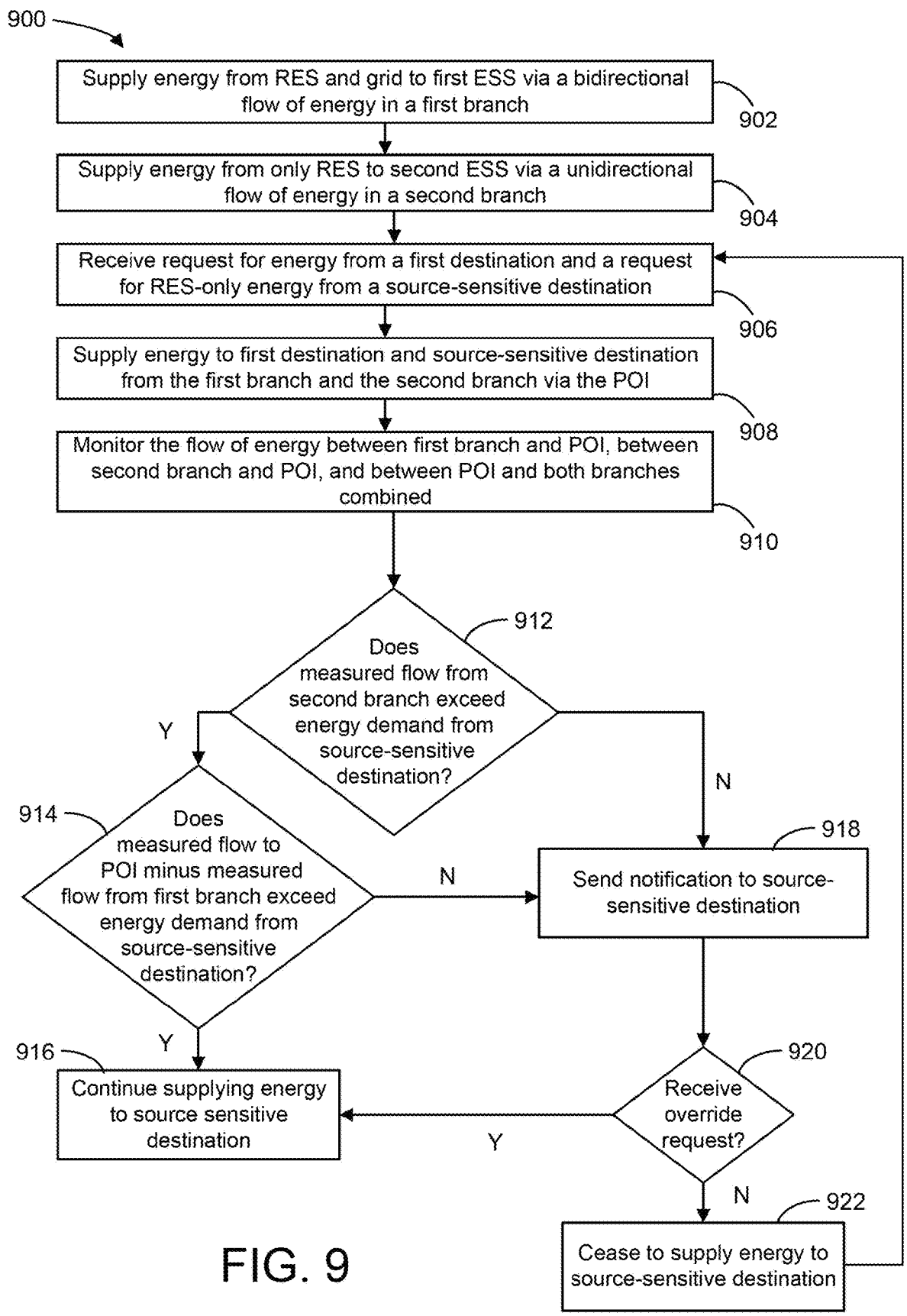
FIG. 9-11 illustrate a flowcharts of example methods for controlling the renewable energy source and energy storage system of FIGS. 3-8B, according to some embodiments.

FIG. 9 illustrates a method 900 for controlling the flow of electricity to one or more electrical loads including a source-sensitive destination, according to some embodiments. A source-sensitive destination may be a load in which the owner or operator desires or requires that only energy from the renewable sources reaches the load. The method 900 can be performed by a processing circuit (e.g., a controller, a computer the controller 204, the RES SCADA controller 12, etc.). In some embodiments, the processing circuit is the controller of a renewable energy plant that contains a RES that charges a first ESS and a second ESS of the renewable energy plant. For example, the processing circuit may be the controller 204 that is configured to control the RES-ESS system 300. The processing circuit may control equipment that operates to control the flow of electricity in the renewable energy plant. The first ESS and the second ESS may both be connected to a point of interconnection (POI) that connects the renewable energy plant to the grid. The processing circuit may control the flow of energy so that the first ESS may receive energy from both the RES and the grid via a first branch and can deliver energy to the grid via the POI, while the second ESS can receive energy from only the RES via a second branch and can deliver energy to the grid via the POI. The method 900 may include more or fewer operations, and the operations may be performed in any order, except where specified.

At operation 902 of the method 900, the processing circuit allows energy received from the RES and the grid to flow to the first ESS via the first electrical branch. For example, the processing circuit may control the components of the renewable energy plant to ensure that the absolute voltages at the POI and the RES are both higher than the voltage at the first ESS. The first ESS may store the energy received from the grid and the RES. At operation 904, the processing circuit allows energy received from the RES, but not the grid, to flow to the second ESS via the second electrical branch. For example, the processing circuit may control the components of the renewable energy plant to ensure that the magnitude of the voltage at the RES is higher than the magnitude of the voltage at the second ESS. The second ESS may store the energy received from the RES. Thus, the processing circuit may control the flow of energy in the RES-ESS system to direct the energy received from the RES to the first ESS and the second ESS, while not allowing energy to flow from the grid to the second ESS.

At operation 906, the processing circuit may receive a request for energy from a first non-source-sensitive destination, and a request for RES-only energy from a source-sensitive destination. The operator of the source-sensitive destination may wish to ensure that all of the energy delivered to the source-sensitive destination is generated from renewable sources, such as solar or wind energy. At operation 908, the processing circuit may control the flow of energy in the renewable energy plant such that energy is supplied to the first destination and the source-sensitive destination from the first branch and the second branch, via the POI and the grid. At operation 910, the processing circuit may monitor the flow of energy between the first branch and the POI, the second branch and the POI, and the POI and both branches combined. For example, a first meter may be positioned along the first branch between the first ESS and the POI and may measure the flow of energy from the RES and the first ESS to the POI via the first branch. A second meter may be positioned along the second branch between the second ESS and the POI and may measure the flow of energy from the RES and the second ESS to the POI via the second branch.

At operation 912, the processing circuit may determine whether the measured flow of energy from the second branch to the POI (e.g., at the second meter) meets or exceeds the energy demanded from the source-sensitive destination. If the amount of energy flowing from the second branch to the POI does not exceed the energy demanded by the source-sensitive destination, the renewable energy plant may not be able to guarantee that the energy flowing to the source-sensitive destination was generated using renewable energy. If the processing circuit determines that the measured flow of energy from the second branch to the POI meets or exceeds the energy demand from the source-sensitive destination, the processing circuit proceeds to operation 914, where an additional check is performed to ensure that the renewable energy system is outputting at least as much energy from renewable sources as is demanded by the source-sensitive destination. At operation 914, the processing circuit may determine whether the measured flow of energy into the POI (e.g., the third meter) from the renewable energy plant minus the measured flow of energy from the first branch to the POI (e.g., at the first meter) meets or exceeds the energy demanded from the source-sensitive destination. If the amount of energy flowing into the POI minus the amount of energy flowing from the first branch does not exceed the energy demanded by the source-sensitive destination, this may indicate that the initial reading at the second mater at operation 912 was inaccurate, and the renewable energy plant may not be able to guarantee that the energy flowing to the source-sensitive destination was generated using renewable energy. If it is determined at both operation 912, 914, that more energy is flowing from the second branch to the POI than is demanded by the source-sensitive destination, the processing circuit may, at operation 916, continue to supply energy to the source-sensitive destination.

If it is determined at operation 912 or 914 that the amount of energy flowing from the first branch to the POI does not meet or exceed the amount of energy demanded by the source-sensitive destination, the processing circuit may send a notification or alert to the source-sensitive destination at operation 918. The energy demanded by the source-sensitive destination may be referred to as an energy threshold, and the alert may be sent when it is determined that the measured energy in the first branch does not meet the energy threshold. The message may indicate to the source-sensitive destination that the renewable energy plant cannot guarantee that the energy being delivered to the source-sensitive destination was generated from renewable energy sources. The notification may indicate to the source-sensitive destination that it will stop supplying energy to the source-sensitive destination unless an override command is received. The operator of the source-sensitive destination may then determine whether the source-sensitive destination should continue receiving energy, which may not have been generated by renewable energy sources, or should reduce the amount of energy demanded.

At operation 920, the processing circuit may receive or not receive an override request from the source-sensitive destination permitting the system to continue supplying energy to the source-sensitive destination. If the override request is received, the processor may execute operation 916 to continue supplying energy to the source-sensitive destination. If no override request is received, the processing circuit may, at operation 922, cease to supply energy to the source-sensitive destination. In some embodiments, ceasing to supply energy to the source-sensitive destination may comprise sending a message or alert to the source-sensitive destination indicating that the energy being delivered is not guaranteed to be from renewable sources. The alert may cause the source-sensitive destination to reduce its energy demand or cease operation so that no energy is delivered to the source-sensitive destination. Thus, in some embodiments, in response to the measured energy not meeting an energy threshold, the RES-ESS system may cease to send energy to the source-sensitive destination. In some embodiments, the processing circuit may continue to supply energy to the source-sensitive destination for a predetermined amount of time after sending the notification at operation 918. After the predetermined amount of time has elapsed without an override request being received, the processing circuit may proceed to operation 922, ceasing energy flow to the source-sensitive destination. In some embodiments the processing circuit may continue to allow energy to flow to the source-sensitive destination until an override request is received or a do not override request is received. Operations 906-922 may repeat as necessary either continuously or periodically. For example, if the processing circuit determines at operation 920 that no override request has been received and ceases to supply energy to the source-sensitive destination at operation 922, the processing circuit may return to operation 906 to determine whether the amount of energy requested by the source-sensitive destination has been reduced and the flow of energy to the source-sensitive destination can continue.

Figure 10:
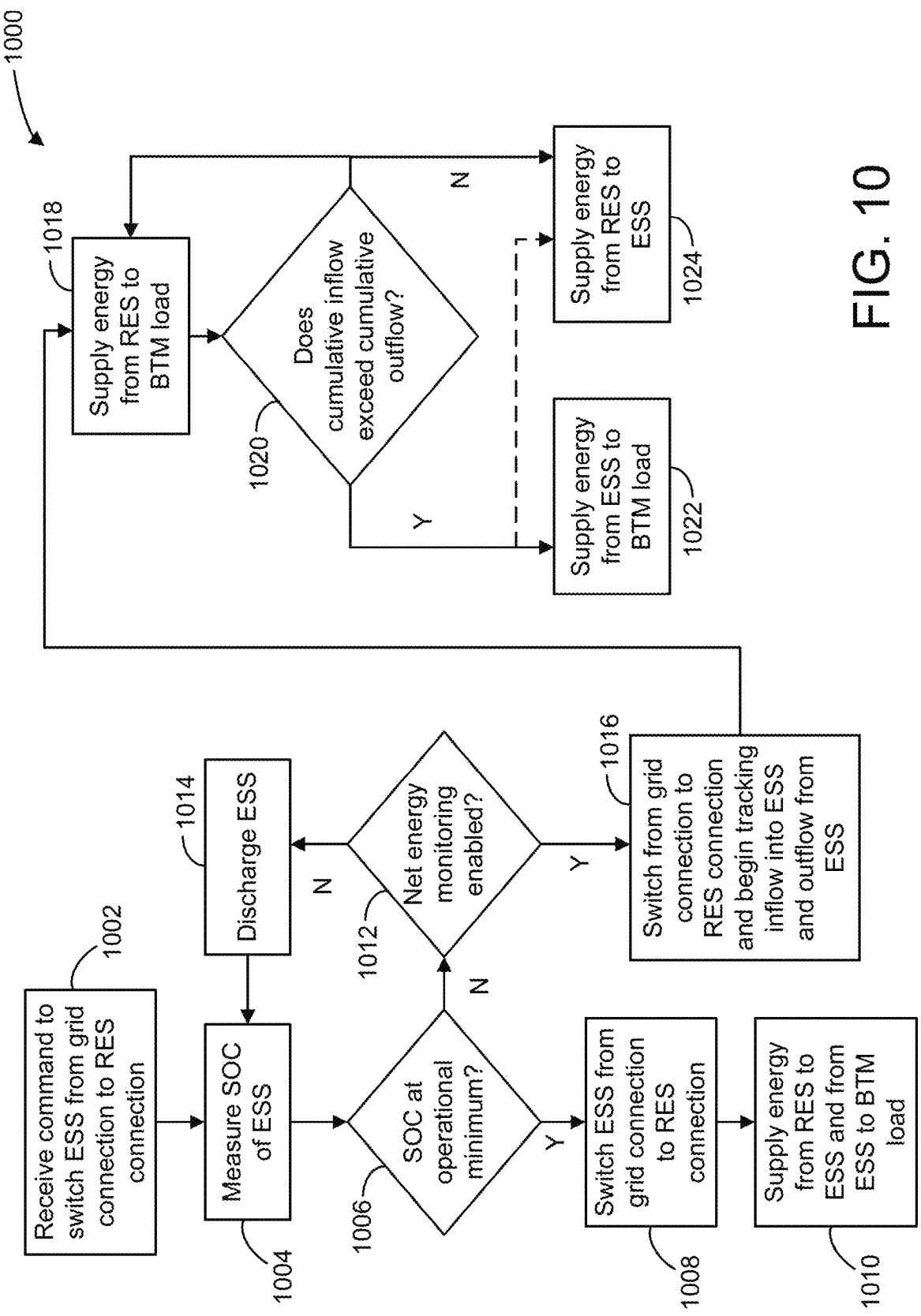

FIG. 10 illustrates a method 1000 for controlling the flow of electricity to a BTM load, according to some embodiments. The method 1000 can be performed by a processing circuit (e.g., a controller, a computer, the controller 204, the RES SCADA controller 12, etc.). In some embodiments, the processing circuit is the controller of a renewable energy plant that contains a RES that charges an ESS of the renewable energy plant. For example, the processing circuit may be the controller 204 that is configured to control the RES-ESS system 300. The processing circuit may control equipment that operates to control the flow of electricity in the renewable energy plant. The processing circuit may do so in such a way as to ensure that only renewable energy reaches the BTM load or that the RES supplies as least as much renewable energy to the ESS as the ESS supplies to the BTM load.

At operation 1002, the processing circuit receives a command to disconnect the ESS from a energy grid and to connect the ESS to the RES. The energy grid may supply energy from a mix of various renewable and nonrenewable energy sources. The command to disconnect the ESS may be received from a BTM load, from an operator of the BTM load via a user device, from a set switching schedule, from detected or measured energy demands of the BTM load, from detected or measured energy generated by the RES, etc. Upon disconnecting from the energy grid, the ESS may no longer receive energy from the energy grid, and upon connecting to the RES, the ESS may receive energy only from the RES. The energy delivered to the ESS from the RES may be generated completely from renewable sources. Thus, upon disconnecting from the energy grid and connecting to the RES, the ESS may only receive renewable energy.

At operation 1004, the state of charge (SOC) of the ESS is measured. The SOC of the ESS may be measured, for example by a voltmeter or an ammeter, and the processing circuit may receive the measurement.

At operation 1006, the processing circuit determines whether the SOC of the ESS is at an operational minimum. The SOC of ESS is considered to be at the operational minimum when no further energy can be output by the ESS. If the SOC of the ESS is at the operational minimum, the processing circuit may allow the ESS to switch from grid connection to RES connection at operation 1008. Because the SOC was at the operational minimum, once the ESS switches to the RES connection, the ESS may store energy only from the RES, and therefore only energy from renewable resources. At operation 1010, the processing circuit may allow the ESS and the RESS to supply energy to the BTM load. Because it was determined at operation 1006 that the SOC of the ESS was at the operational minimum, the flow of energy to and from the ESS does not need to be measured, because the ESS can contain only energy from the RES and no energy from non-renewable resources.

If, at operation 1006, the processing circuit determines that the SOC of the ESS is not at the operational minimum, the processing circuit may then determine, at operation 1012, whether net energy monitoring has been enabled. For example, the processing circuit may query a database in the memory 220 or in the inflow/outflow monitor module 226 to determine whether the source-sensitive destination has indicated that it authorizes net monitoring. In some embodiments, the processing circuit 204 may send a message via the communications interface 234 to the source-sensitive destination requesting authorization for net monitoring. The source-sensitive destination (e.g., a computer, controller, or operator of the source-sensitive destination) may send a return message to the processing circuit authorizing net monitoring. When net monitoring is enabled, the flow of renewable energy into the ESS is compared to the flow of energy out of the ESS. Though some energy flowing out of the ESS may not have been generated by renewable energy sources, when net energy monitoring is enabled, energy may be supplied to the BTM load as long as the amount of energy received by the ESS from the RES is equal to or greater than the amount of energy sent from the ESS to the BTM load. When net energy monitoring is not enabled, no energy may flow to the BTM load unless the SOC is first reduced to the operational minimum, such that no non-renewable energy is stored in the ESS. If the processing circuit determines at operation 1012 that net energy monitoring has not been enabled, the processing circuit may cause the ESS to discharge (e.g., to the grid or a non-source-sensitive destination) at operation 1014. Operations 1004 and 1006 may then be repeated, and, if the SOC has successfully been reduced to the operational minimum, the processing circuit may execute operations 1008 and 1010 as described above.

Figure 11:
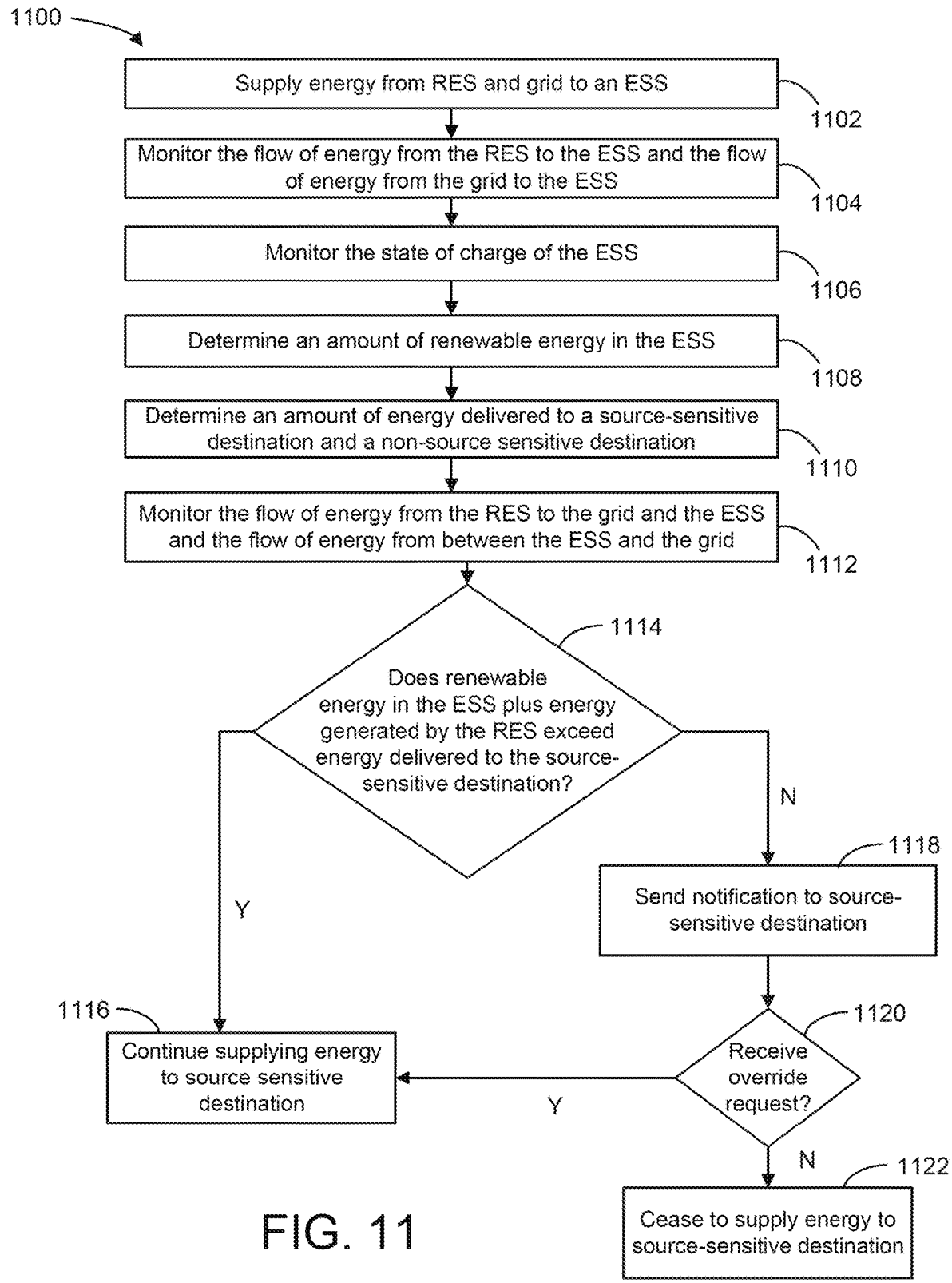

If the processing circuit determines at operation 1012 that net energy monitoring has been enabled, the processing circuit may, at operation 1016, switch the ESS from grid connection to RES connection and begin tracking energy inflow into the ESS and energy outflow from the ESS for a first time period. The processing circuit may then allow energy to be supplied from the RES to the BTM load at operation 1018. At operation 1020, the processing circuit may determine whether the cumulative energy inflow into the ESS is equal to or exceeds the cumulative energy outflow from the ESS to the BTM load within the first time period. For example, the processing circuit may receive readings from flow meters and/or SOC monitoring systems to measure the flow of energy from the RES to the ESS and the flow of energy from the ESS to the BTM load. The processing circuit may then compare the inflow to the outflow. If the cumulative energy inflow into the ESS is equal to or exceeds the cumulative energy outflow, the processing circuit may allow energy to flow from the ESS to the BTM load at operation 1022. If, at operation 1020, the processing circuit determines that the cumulative energy inflow is less than the cumulative energy outflow, the processing circuit may, at operation 1024, allow energy to be supplied from the RES to the ESS, as well as continuing to execute operation 1018 to allow energy to be supplied directly to the BTM load from the RES. Operation 1024 may be executed regardless of the whether it is determined that cumulative inflow exceeds cumulative outflow at operation 1024 Operations 1018-1024 may be continuously or periodically repeated as the cumulative inflow into and outflow out of the ESS changes over time. In some embodiments, the energy flowing into and out of the ESS may be continuously monitored using energy flow meters and/or an SOC monitoring system, and the amount of renewable energy in the ESS at the beginning of the first time period may be determined. At operation 1020, the cumulative inflow may be added to the energy stored in the ESS at the beginning of the first time period, and the sum may be compared to the cumulative outflow to the BTM load. Energy may be supplied to the BTM load while the sum of the initial energy and the energy flowing into the ESS is greater than the cumulative outflow FIG. 11 illustrates a method 1100 for controlling the flow of electricity to one or more electrical loads including a source-sensitive destination, according to some embodiments. The method 1100 can be performed by a processing circuit (e.g., a controller, a computer the controller 204, the RES SCADA controller 12, etc.). In some embodiments, the processing circuit is the controller of a renewable energy plant. For example, the processing circuit may be the controller 204 that is configured to control the RES-ESS system 300. The processing circuit may control equipment that operates to control the flow of electricity in the renewable energy plant. The ESS may be connected to a point of interconnection (POI) that connects the renewable energy plant to the grid. The processing circuit may control the flow of energy so that the ESS may receive energy from both the RES and the grid via the POI and can deliver energy to the grid via the POI. The method 1100 may include more or fewer operations, and the operations may be performed in any order, except where specified. The processing circuit may receive data from one or more energy flow meters configured to measure the flow of energy in the renewable energy plant and one or more SOC monitoring systems configured to measure the SOC of the ESS. In some embodiments, the ESS may include a renewable energy-only storage and a mixed energy storage. These may be referred to collectively as the ESS or may be referred to as separate ESSs. In some embodiments the ESS may include only a mixed energy storage.

At operation 1102 of the method 1100, the processing circuit allows energy received from the RES and the grid to flow to be supplied to the first ESS. For example, the processing circuit may control the components of the renewable energy plant to ensure that the absolute voltages at the POI and the RES are both higher than the voltage at the ESS. The ESS may store the energy received from the grid and the RES. At operation 1104, the processing circuit monitors the flow of energy from the RES to the ESS and the flow of energy from the grid to the ESS. For example, the processing circuit may monitor the flow of energy based on received data including current or voltage measurements from the one or more energy flow meters. At operation 1106, the processing circuit monitors the SOC of the ESS. For example, the processing circuit monitor the SOC of the ESS based on received data including current or voltage measurements from the SOC monitoring system coupled to the ESS.

At operation 1108, the processing circuit may determine the amount of renewable energy in the ESS at the beginning of a first time period. Using the data received from the energy flow meters and/or the SOC monitoring system, the processing circuit may determine how much energy is stored in the ESS, how much of the stored energy was supplied from renewable source (e.g., the RES), and how much of the stored energy was supplied from a non-renewable or mixed source (e.g., from the grid).

At operation 1110, the processing circuit may determine, during the first time period, an amount of energy delivered to a source-sensitive destination (e.g., a first energy output), and a second amount of energy delivered to a non-source-sensitive destination (e.g., a second energy output). For example, in some embodiments, the source-sensitive destination and the non-source-sensitive destination may receive energy from the grid. The processing circuit may receive an indication from the grid of how much energy the grid is supplying to each destination during the first time period. In some embodiments, the source-sensitive destination and/or the non-source-sensitive destination may be coupled directly to the renewable energy plant rather than being connected through the grid. The processor may receive data from energy flow sensors indicating the amount of energy delivered to each destination. In some embodiments, the source-sensitive destination is a BTM load that can receive energy from the renewable energy plant without the energy being transmitted through the grid. The BTM load may also be configured to receive energy from the grid. In some embodiments, the non-source sensitive destination may be the grid itself. At operation 1112, during the first time period, the processing circuit monitors the flow of energy from the RES to the grid and the ESS and monitors the flow of energy between the ESS and the grid. For example, the processing circuit may monitor the flow of energy based on received data including current or voltage measurements from the one or more energy flow meters.

At operation 1114, the processing circuit may determine whether, during the first time period, the renewable energy in the ESS at the beginning of the first time period, plus the energy generated by the RES during the first time period meets or exceeds the energy delivered to the source-sensitive destination (e.g., the first energy output). For example, if the if the ESS has 10 kWh at the beginning of the first time period, the RES generates 10 kWh during the first time period, and the renewable energy plant supplies 21 kWh to the source-sensitive load in the first time period, the processing circuit may determine that the first energy output exceeded the available renewable energy for the first time period by 1 kWh (10 kWh+10 kWh−21 kWh). The calculation may also take into account energy delivered to the ESS by the RES during the first time period, as that energy would still remain within the ESS and cannot have been delivered to the source-sensitive destination. For example, if the ESS has 10 kWh at the beginning of the first time period, the RES generates 10 kWh during the first time period, and the ESS receives 5 kWh from the RES during the first time period, and the renewable energy plant supplies 17 kWh to the source-sensitive load in the first time period, the processing circuit may determine that the first energy output exceeded the available renewable energy for the first time period by 2 kWh (10 kWh+10 kWh−5 kWh−17 kWh).

In some embodiments, the RES may continue to supply energy directly to the grid while the ESS is supplying energy to the grid. At operation 1114, the energy supplied directly to the grid from the RES may be added to the renewable energy stored in the ESS, and the processing circuit may determine whether the total amount of energy stored in the ESS combined with the energy supplied directly from the RES to the grid meets or exceeds the amount of energy delivered to the source-sensitive destination. If the processing circuit determines at operation 1114 that the renewable energy in the ESS meets or exceeds the energy delivered to the source-sensitive destination, the processing circuit, at operation 1116 may control the renewable energy plant to continue supplying energy to the source sensitive destination.

If it is determined at operation 1114 that the renewable energy in the ESS does not meet or exceed the amount of energy supplied to the source-sensitive destination, the processing circuit may send a notification or alert to the source-sensitive destination at operation 1118. The energy demanded by the source-sensitive destination may be referred to as a power threshold or an energy threshold, and the alert may be sent when it is determined that the measured energy in the first branch does not meet the energy threshold. The message may indicate to the source-sensitive destination that the renewable energy plant cannot guarantee that the energy being delivered to the source-sensitive destination was generated from renewable energy sources. The notification may indicate to the source-sensitive destination that it will stop supplying energy to the source-sensitive destination unless an override command is received. The operator of the source-sensitive destination may then determine whether the source-sensitive destination should continue receiving energy, which may not have been generated by renewable energy sources, or should reduce the amount of energy demanded.

At operation 1120, the processing circuit may receive or not receive an override request from the source-sensitive destination permitting the system to continue supplying energy to the source-sensitive destination. If the override request is received, the processor may execute operation 1116 to continue supplying energy to the source-sensitive destination. If no override request is received, the processing circuit may, at operation 1122, cease to supply energy to the source-sensitive destination. In some embodiments, "ceasing to supply energy" or power to the source-sensitive destination may comprise sending a message or alert to the source-sensitive destination indicating that the energy being delivered is not guaranteed to be from renewable sources. The alert may cause the source-sensitive destination to reduce its energy demand or cease operation so that no energy is delivered to the source-sensitive destination. Thus, in some embodiments, in response to the measured energy not meeting an energy threshold, the RES-ESS system may cease to send energy to the source-sensitive destination. In some embodiments, "ceasing to supply energy" to the source-sensitive destination may comprise ceasing to designate or earmark energy for the source-sensitive destination. In some embodiments, "ceasing to supply energy" to the source-sensitive destination may comprise reducing the amount of energy supplied. In some embodiments, the processing circuit may continue to supply energy to the source-sensitive destination for a predetermined amount of time after sending the notification at operation 1118. After the predetermined amount of time has elapsed without an override request being received, the processing circuit may proceed to operation 1122, ceasing energy flow to the source-sensitive destination. In some embodiments the processing circuit may continue to allow energy to flow to the source-sensitive destination until an override request is received or a do not override request is received. Operations 1102-1122 may repeat as necessary either continuously or periodically. For example, if the processing circuit determines at operation 1120 that no override request has been received and ceases to supply energy to the source-sensitive destination at operation 1122, the processing circuit may return to operation 1102 to supply additional energy to the ESS and may again determine at 1114 whether the amount of energy supplied to the source-sensitive destination still exceeds the renewable energy in the ESS during the first time period.

In an aspect, a non-transitory computer readable storage medium in an energy control system is provided. The medium includes instructions stored thereon that, upon execution by a processor, cause the processor to determine, for a first time period, a first energy output sent from an energy system to a source-sensitive destination and a second energy output sent from the energy system to a non-source-sensitive destination, wherein the energy system includes a renewable energy source (RES) and a non-renewable energy source and an energy storage system (ESS). The instructions, when executed by the processor further cause the processor to determine renewable energy stored in the ESS at the start of the first time period and, upon determining that the renewable energy in the ESS at the start of the first time period plus energy generated by the RES during the first time period minus the first energy output is zero or less than zero, communicate a message to the source-sensitive destination indicating that energy supplied is not guaranteed to be from the RES.

In some embodiments, the ESS includes a renewable energy-only storage and a mixed energy storage. In some embodiments, the mixed energy storage includes energy received from the renewable energy source and the non-renewable energy source. In some embodiments, the renewable energy-only storage includes only energy received from the renewable energy source.

In some embodiments, the instructions, when executed by the processor, further cause the processor to deliver energy remaining in the ESS to the non-source-sensitive destination.

In some embodiments, an energy demand from the source-sensitive destination is reduced based on receipt of the message.

In some embodiments, the instructions, when executed by the processor, further cause the processor to continue sending energy from the energy system to the source-sensitive destination upon receipt of instructions to continue in response to the message.

In some embodiments, the non-renewable energy source includes an electrical grid. In some embodiments, determining the renewable energy stored in the ESS includes measuring the amount of energy delivered to the ESS from the renewable energy source.

In some embodiments, the instructions, when executed by the processor, further cause the processor to transmit a second message to the non-source-sensitive destination or to the grid indicating the energy remaining in the ESS at the end of the first time period.

In some embodiments, the instructions, when executed by the processor, further cause the processor to send an amount of energy from the from the energy system to the source-sensitive destination that does not exceed an amount of energy being generated by the RES In another aspect, a method is provided. The method may include receiving energy at an energy system from a renewable energy source (RES), directing the received energy from the RES to a first energy storage system (ESS) and a second ESS, establishing a unidirectional flow of energy from the first ESS via a first meter to a point of interconnection (POI), establishing a bi-directional flow of energy from the second ESS via a second meter to the POI, wherein the POI is connected to a power grid and the second ESS is configured to receive energy from a power grid via the bi-directional flow, determining whether a first amount of energy requested by a source-sensitive destination exceeds a measured energy measured by the first meter; and sending an alert to the source-sensitive destination indicating that the energy supplied is not guaranteed to be from the RES in response to determining that the first amount of energy exceeds the measured energy.

In some embodiments, the method further includes receiving energy at the energy system from the power grid. In some embodiments, an energy demand from the source-sensitive destination is reduced based on receipt of the alert. In some embodiments, the method further includes continuing to send energy from the energy system to the source-sensitive destination upon receipt of instructions to continue in response to the message. In some embodiments, the method further includes converting energy generated by the RES from DC to AC for transmission to the ESS, and converting the AC back to DC for storage in the ESS. In some embodiments, the method further includes logging measurements from the first meter and the second meter. In some embodiments, only energy from the first ESS is sent to the source-sensitive destination.

In another aspect, a system is provided. The system includes a renewable energy source (RES) that provides electrical energy, a first energy storage system (ESS) coupled to and configured to receive electrical energy from the RES, wherein the first ESS is configured to direct electrical energy to a source-sensitive destination, and a second ESS coupled to and configured to receive electrical energy from the RES and coupled to and configured to receive electrical current from a non-renewable energy source to receive electrical energy, wherein the second ESS is configured to direct electrical energy to a non-source-sensitive destination. The system further includes a controller including a processor and a non-transitory computer readable storage medium including instructions stored thereon that, upon execution by the processor, cause the controller to establish a unidirectional flow of energy from the first ESS via a first meter to a point of interconnection (POI) and establish a bi-directional flow of energy from the second ESS via a second meter to the POI, wherein the POI is connected to a power grid and the power grid is configured to provide energy to the second ESS via the bi-directional flow.

In some embodiments, the system further includes an inverter coupling the first ESS to a point of interconnection (POI), wherein the inverter is configured to control a flow of energy between the first ESS and the POI. In some embodiments, the system further includes an inverter coupling the second ESS to a point of interconnection (POI), wherein the inverter is configured to control a flow of energy between the second ESS and the POI. In some embodiments, the instructions, when executed by the processor, further cause the controller to determine an amount of available renewable energy from the RES stored in the first ESS and upon determining that the amount of available renewable energy in the first ESS is zero, send an amount of energy to the source-sensitive destination that does not exceed an amount of energy being generated by the RES. In some embodiments, the instructions, when executed by the processor, further cause the controller to send a first amount of energy to the source-sensitive destination that does not exceed a measured energy measured by the first meter. In some embodiments, the instructions, when executed by the processor, further cause the controller to send an alert to the source-sensitive destination that the energy supplied is not guaranteed to be from the RES. In some embodiments, the first ESS is configured to direct electrical energy to the source-sensitive destination via an electrical grid, and wherein the second ESS is configured to direct electrical energy to the non-source-sensitive destination via the electrical grid.

In another aspect, a system is provided. The system includes a first renewable energy source (RES) configured to provide an electrical energy, a first circuit including a first energy storage system (ESS) and a point of interconnection (POI) coupled to a power grid, a second circuit including a second ESS and a source-sensitive destination, and a first switch configured to selectively connect one of the first circuit or the second circuit to the first RES.

In some embodiments, the first circuit is not configured to be connected to the second circuit. In some embodiments, the system further includes a controller including a processor and a non-transitory computer readable storage medium including instructions stored thereon that, upon execution by the processor, cause the controller to operate the first switch to separately connect the first circuit and the second circuit to the first RES. In some embodiments, the first RES is one of a plurality of RESs, the system further including a plurality of switches, each switch configured to selectively connect one of the plurality of RESs to one of the first circuit or the second circuit.

In some embodiments, the system further includes a controller including a processor and a non-transitory computer readable storage medium including instructions stored thereon that, upon execution by the processor, cause the controller to operate each of the plurality of switches to connect one of the plurality of RESs to the first circuit or the second circuit. In some embodiments, the controller is configured to couple a first number of switches to the first circuit and a second number of switches to the second circuit based at least in part on an energy demand from the source-sensitive destination. In some embodiments, each of the plurality of RESs is a subset of an array of photovoltaic panels.

In another aspect, a system is provided. The system includes a first RES configured to be selectively coupled to a first circuit or a second circuit via a first RES switch, a first ESS configured to be selectively coupled to the first circuit or the second circuit via a first ESS switch, a POI coupled to the first circuit and configured to receive energy from and supply energy to an electrical grid, and a source-sensitive destination coupled to the second circuit, wherein the first circuit is not configured to be coupled to the second circuit.

In some embodiments, when the first RES switch is coupled to the first circuit and the first ESS switch is coupled to the first circuit, flows of energy are enabled (a) from the first RES and the grid to the first ESS and (b) from the first RES and the first ESS to the grid.

In some embodiments, when the first RES switch is coupled to the first circuit and the first ESS switch is coupled to the second circuit, flows of energy are enabled (a) from the first RES to the grid and (b) from the first ESS to the source-sensitive destination.

In some embodiments, when the first RES switch is coupled to the second circuit and the first ESS switch is coupled to the first circuit, flows of energy are enabled (a) from the first RES to the source-sensitive destination, (b) from the first ESS to the grid, and (c) from the grid to the first ESS.

In some embodiments, when the first RES switch is coupled to the second circuit and the first ESS switch is coupled to the second circuit, flows of energy are enabled (a) from the first RES and the first ESS to the source-sensitive destination and (b) from the first RES to the first ESS.

In some embodiments, the system further includes a state of charge (SOC) monitoring system configured to measure the SOC of the first ESS and a controller including a processor and a non-transitory computer readable storage medium. The storage medium includes instructions stored thereon that, upon execution by the processor, cause the controller to receive a measured SOC of the first ESS from the SOC monitoring system, determine that the measured SOC is an operational minimum SOC of the first ESS, and based on determining that the measured SOC is the operational minimum SOC, send a signal to the first ESS switch to couple the first ESS to the second circuit.

In some embodiments, the system further includes a state of charge (SOC) monitoring system configured to measure the SOC of the first ESS and a controller including a processor and a non-transitory computer readable storage medium. The storage medium includes instructions stored thereon that, upon execution by the processor, cause the controller to send a signal to the first RES switch to couple the first RES to the second circuit, at a first time, send a signal to the first ESS switch to couple the first ESS to the second circuit, at the first time, receive a first measured SOC of the first ESS from the SOC monitoring system, at a second time, receive a second measured SOC of the first ESS from the SOC monitoring system, and upon determining that the second measured SOC does not exceed the first measured SOC, disable a flow of energy from the first ESS to the source-sensitive destination. In some embodiments, disabling the flow of energy from the first ESS to the source-sensitive destination includes sending a signal to the first ESS switch to move into a neutral position in which the first ESS is not connected to either of the first or second circuits. In some embodiments, the system further includes an inverter coupling the first ESS to the first ESS switch, wherein disabling the flow of energy from the first ESS to the source-sensitive destination includes sending a signal to the inverter to reduce a voltage at the first ESS.

In some embodiments, the system further includes a second RES configured to be selectively coupled to the first circuit or a second circuit via a second RES switch, and a second ESS configured to be selectively coupled to the first circuit or the second circuit via a second ESS switch.

In another aspect, a system is provided. The system includes a renewable energy source (RES) that provides electrical energy a first energy storage system (ESS) coupled to the RES and configured to receive at least a portion of the electrical energy from the RES, wherein the first ESS is configured to direct electrical energy to a source-sensitive destination, a second ESS coupled to the RES and configured to receive at least a portion of the electrical energy from the RES and coupled to an electrical grid to receive at least a portion of a second electrical energy from the electrical grid, wherein the second ESS is configured to supply electrical energy to the electrical grid, and a controller including a processor and a non-transitory computer readable storage medium. The storage medium includes instructions stored thereon that, upon execution by the processor, cause the controller to establish a unidirectional flow of energy from the first ESS to the second ESS and the electrical grid, wherein electrical energy from the second ESS and the electrical grid cannot flow to the first ESS.

In some embodiments, the system further includes a first inverter coupling the first ESS to a point of interconnection (POI), the POI coupling the first ESS and the second ESS to the grid, and a second inverter coupling the second ESS to the POI. In some embodiments, establishing the unidirectional flow of energy includes controlling the first inverter, the second inverter, and the POI such that a first voltage is maintained at a first point between the first ESS and the second ESS and a second voltage that is lower (e.g., lower in magnitude) than the first voltage is maintained at a second point, wherein the second point is between the first point and the second ESS. In some embodiments, the first point is between the source-sensitive destination and the second ESS, such that energy cannot flow from the second ESS to the source-sensitive destination.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
    a first RES configured to be selectively coupled to a first circuit or a second circuit via a first RES switch;
    a first ESS configured to be selectively coupled to the first circuit or the second circuit via a first ESS switch;
    a POI coupled to the first circuit and configured to receive energy from and supply energy to an electrical grid;
    a source-sensitive destination coupled to the second circuit, wherein the first circuit is not configured to be coupled to the second circuit;
    a state of charge (SOC) monitoring system configured to measure the SOC of the first ESS; and
    a controller comprising a processor and a non-transitory computer readable storage medium comprising instructions stored thereon that, upon execution by the processor, cause the controller to:
        send a signal to the first RES switch to couple the first RES to the second circuit;
        at a first time, send a signal to the first ESS switch to couple the first ESS to the second circuit;
        at the first time, receive a first measured SOC of the first ESS from the SOC monitoring system;
        at a second time, receive a second measured SOC of the first ESS from the SOC monitoring system; and
        upon determining that the second measured SOC does not exceed the first measured SOC, disable a flow of energy from the first ESS to the source-sensitive destination.

2. The system of claim 1, wherein when the first RES switch is coupled to the first circuit and the first ESS switch is coupled to the first circuit, flows of energy are enabled (a) from the first RES and the grid to the first ESS and (b) from the first RES and the first ESS to the grid.

3. The system of claim 1, wherein when the first RES switch is coupled to the first circuit and the first ESS switch is coupled to the second circuit, flows of energy are enabled (a) from the first RES to the grid and (b) from the first ESS to the source-sensitive destination.

4. The system of claim 1, wherein when the first RES switch is coupled to the second circuit and the first ESS switch is coupled to the first circuit, flows of energy are enabled (a) from the first RES to the source-sensitive destination, (b) from the first ESS to the grid, and (c) from the grid to the first ESS.

5. The system of claim 1, wherein when the first RES switch is coupled to the second circuit and the first ESS switch is coupled to the second circuit, flows of energy are enabled (a) from the first RES and the first ESS to the source-sensitive destination and (b) from the first RES to the first ESS.

6. The system of claim 1, wherein the controller is further configured to:
receive a measured SOC of the first ESS from the SOC monitoring system;
determine that the measured SOC is an operational minimum SOC of the first ESS; and
based on determining that the measured SOC is the operational minimum SOC, send a signal to the first ESS switch to couple the first ESS to the second circuit.

7. The system of claim 1, wherein disabling the flow of energy from the first ESS to the source-sensitive destination comprises sending a signal to the first ESS switch to move into a neutral position in which the first ESS is not connected to either of the first or second circuits.

8. The system of claim 1, further comprising an inverter coupling the first ESS to the first ESS switch, wherein disabling the flow of energy from the first ESS to the source-sensitive destination comprises sending a signal to the inverter to reduce a voltage at the first ESS.

9. The system of claim 1, further comprising:
a second RES configured to be selectively coupled to the first circuit or a second circuit via a second RES switch; and
a second ESS configured to be selectively coupled to the first circuit or the second circuit via a second ESS switch.

10. Non-transitory computer-readable media comprising computer-executable instructions embodied thereon that, when executed by one or more processors, cause the one or more processors to perform a process comprising:
sending a first signal to a first renewable energy system (RES) switch to couple a first RES to a second circuit, the second circuit coupled to a source-sensitive destination;
sending a second signal at a first time to a first energy storage system (ESS) switch to couple a first ESS to the second circuit;
receiving at the first time a first measured SOC of the first ESS from a state of charge (SOC) monitoring system configured to measure the SOC of the first ESS;
receiving at a second time a second measured SOC of the first ESS from the SOC monitoring system; and
upon determining that the second measured SOC does not exceed the first measured SOC, disabling a flow of energy from the first ESS to the source-sensitive destination.

11. The non-transitory computer-readable media of claim 10, wherein when the first RES switch is coupled to a first circuit, and the first ESS switch is coupled to the first circuit, flows of energy are enabled (a) from the first RES and an electrical grid to the first ESS and (b) from the first RES and the first ESS to the grid.

12. The non-transitory computer-readable media of claim 10, wherein when the first RES switch is coupled to a first circuit and the first ESS switch is coupled to the second circuit, flows of energy are enabled (a) from the first RES to an electrical grid and (b) from the first ESS to the source-sensitive destination.

13. The non-transitory computer-readable media of claim 10, wherein when the first RES switch is coupled to the second circuit and the first ESS switch is coupled to a first circuit, flows of energy are enabled (a) from the first RES to the source-sensitive destination, (b) from the first ESS to an electrical grid, and (c) from the grid to the first ESS.

14. The non-transitory computer-readable media of claim 10, further comprising:
receiving a measured SOC of the first ESS from the SOC monitoring system;
determining that the measured SOC is an operational minimum SOC of the first ESS; and
based on determining that the measured SOC is the operational minimum SOC, sending a signal to the first ESS switch to couple the first ESS to the second circuit.

15. A method, comprising:
sending a first signal to a first renewable energy system (RES) switch to couple a first RES to a second circuit, the second circuit coupled to a source-sensitive destination;
sending a second signal at a first time to a first energy storage system (ESS) switch to couple a first ESS to the second circuit;
receiving at the first time a first measured SOC of the first ESS from a state of charge (SOC) monitoring system configured to measure the SOC of the first ESS;
receiving at a second time a second measured SOC of the first ESS from the SOC monitoring system; and
upon determining that the second measured SOC does not exceed the first measured SOC, disabling a flow of energy from the first ESS to the source-sensitive destination.

16. The method of claim 15, wherein when the first RES switch is coupled to a first circuit, and the first ESS switch is coupled to the first circuit, flows of energy are enabled (a) from the first RES and an electrical grid to the first ESS and (b) from the first RES and the first ESS to the energy grid.

17. The method of claim 15, wherein when the first RES switch is coupled to a first circuit and the first ESS switch is coupled to the second circuit, flows of energy are enabled (a) from the first RES to an electrical grid and (b) from the first ESS to the source-sensitive destination.

18. The method of claim 15, wherein when the first RES switch is coupled to the second circuit and the first ESS switch is coupled to a first circuit, flows of energy are enabled (a) from the first RES to the source-sensitive destination, (b) from the first ESS to an electrical grid, and (c) from the grid to the first ESS.

19. The method of claim 15, further comprising:
receiving a measured SOC of the first ESS from the SOC monitoring system;
determining that the measured SOC is an operational minimum SOC of the first ESS; and
based on determining that the measured SOC is the operational minimum SOC, sending a signal to the first ESS switch to couple the first ESS to the second circuit.

* * * * *